(12) United States Patent
Johnson et al.

(10) Patent No.: US 12,088,458 B1
(45) Date of Patent: Sep. 10, 2024

(54) CONTROLLER DEVICE MANAGEMENT OF PERIPHERAL DEVICES

(71) Applicant: Amazon Technologies, Inc., Seattle, WA (US)

(72) Inventors: Chase Johnson, Maida Vale London (GB); Tri Minh Quach, Edgewood, WA (US); Maximilian Vieweg, Vienna (AU)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 17/197,775

(22) Filed: Mar. 10, 2021

(51) Int. Cl.
*H04L 29/00* (2006.01)
*G06F 13/10* (2006.01)
*H04L 9/40* (2022.01)
*H04L 41/0803* (2022.01)

(52) U.S. Cl.
CPC ........ *H04L 41/0803* (2013.01); *G06F 13/102* (2013.01); *H04L 63/083* (2013.01); *H04L 63/102* (2013.01)

(58) Field of Classification Search
CPC . H04L 41/0803; H04L 63/083; H04L 63/102; G06F 13/102
See application file for complete search history.

(56) References Cited

U.S. PATENT DOCUMENTS

| 7,860,959 | B1 * | 12/2010 | Karpati | H04L 41/0233 |
| | | | | 709/223 |
| 8,869,236 | B1 * | 10/2014 | Tonogai | H04L 63/08 |
| | | | | 713/153 |
| 9,413,597 | B2 * | 8/2016 | Bishop | H04L 41/0618 |
| 10,990,385 | B1 * | 4/2021 | Farhangi | G06F 11/1464 |
| 11,032,164 | B1 * | 6/2021 | Rothschild | H04L 41/40 |
| 11,165,647 | B2 * | 11/2021 | A | H04L 41/0889 |
| 2004/0081173 | A1 * | 4/2004 | Feather | H04L 9/40 |
| | | | | 370/395.54 |
| 2011/0055501 | A1 * | 3/2011 | Wake | G06F 11/1456 |
| | | | | 711/E12.001 |
| 2013/0110658 | A1 * | 5/2013 | Lyman | G06Q 20/36 |
| | | | | 705/41 |
| 2013/0217332 | A1 * | 8/2013 | Altman | G06Q 20/3224 |
| | | | | 455/3.01 |
| 2019/0158353 | A1 * | 5/2019 | Johnson | H04L 41/0803 |

(Continued)

FOREIGN PATENT DOCUMENTS

CN 1620026 A * 5/2005 ......... G05B 19/4185

*Primary Examiner* — Don G Zhao
(74) *Attorney, Agent, or Firm* — Lee & Hayes, P.C.

(57) ABSTRACT

Controller devices may be communicatively coupled to distributed devices in a workspace. The controller devices may be positioned in various geographic locations relative to locations of the distributed devices within the workspace. Each of the controller devices may be utilized to maintain an account of, and locally control, one or more of the distributed devices. Portal devices may utilize the controller devices to manage the distributed devices by configuring, controlling, and updating the controller devices. The control devices may be utilized to establish communication channels between the portal devices and the distributed devices to provide access for a user to the distributed devices. The communication channels may be accessible to user devices based on security credentials that are modified in real-time or near real-time.

20 Claims, 9 Drawing Sheets

(56) References Cited

U.S. PATENT DOCUMENTS

| | | | | |
|---|---|---|---|---|
| 2019/0327179 A1* | 10/2019 | Millin | ................. | H04L 41/0803 |
| 2020/0074048 A1* | 3/2020 | Subramaniam | ..... | H04L 63/1425 |
| 2020/0153911 A1* | 5/2020 | Chauhan | ............... | H04L 65/403 |
| 2020/0195517 A1* | 6/2020 | Manthena | ............ | H04L 41/5041 |
| 2020/0304371 A1* | 9/2020 | Bhagvath | ............ | H04L 41/0654 |
| 2020/0403994 A1* | 12/2020 | Bitterfeld | .............. | G06F 9/5072 |
| 2021/0119871 A1* | 4/2021 | Page | ................... | H04L 41/0894 |
| 2021/0216329 A1* | 7/2021 | Pearce | ................ | G06F 9/44505 |
| 2022/0038340 A1* | 2/2022 | Dreyer | ................ | H04L 41/0883 |
| 2022/0113988 A1* | 4/2022 | Swvigaradoss | ........ | G06N 20/00 |
| 2022/0327438 A1* | 10/2022 | Bach | ................. | G06K 7/10297 |

* cited by examiner

CONTROLLER DEVICE MANAGEMENT OF PERIPHERAL DEVICES

BACKGROUND

Modern inventory systems, such as those in mail order warehouses, supply chain distribution centers, airport luggage systems, and custom-order manufacturing facilities, often utilize devices to move items and/or storage containers within a workspace. Managing firmware and/or software utilized to control the devices of these systems can be cumbersome and unreliable, especially when outages occur. As inventory systems grow, the challenges of discovery, control, and updates of these devices becomes non-trivial. In systems tasked with controlling large numbers of different industrial devices, inefficient processes utilized to support expanding applications of automation and robotic solutions can result in lower throughput, unacceptably long response times, an ever-increasing backlog of unfinished tasks, and, in general, poor system performance. Reliable and robust management of devices of these systems is desirable to improve efficiency and throughput.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
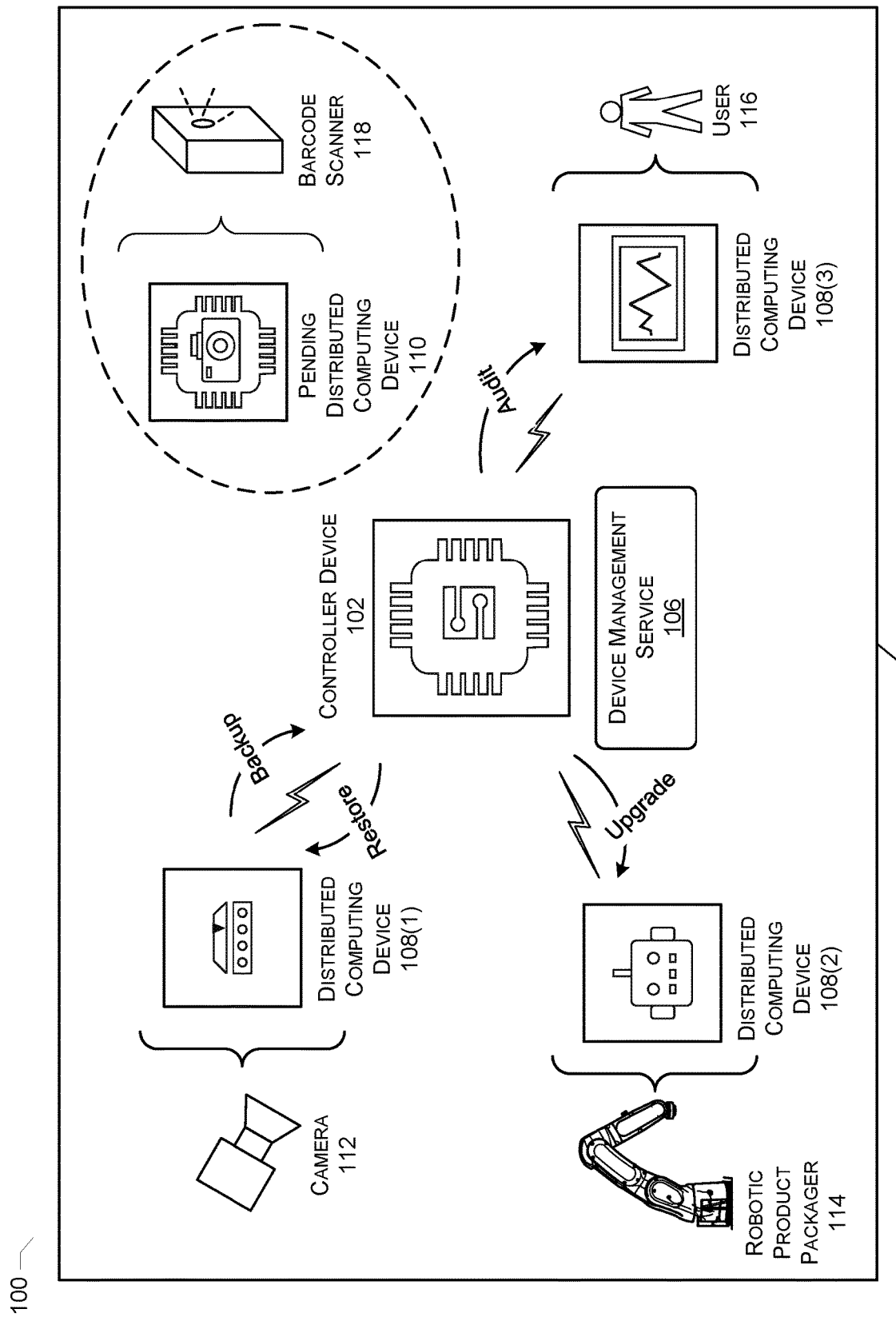
FIG. 1 is an illustrative environment that includes a controller device that is configured to locally manage distributed devices, in accordance with at least one embodiment.

This disclosure is directed to techniques for controlling controller devices communicatively coupled to distributed devices. The controller devices may be positioned in various geographic locations relative to locations of the distributed devices within an environment. Each of the controller devices may be utilized to maintain an account of, and locally control, one or more of the distributed devices. Portal devices may utilize the controller devices to manage the distributed devices by configuring, controlling, and updating the controller devices. The controller devices may be utilized to open a communication channel for communicating with the distributed devices, and to provide access for a user to the distributed devices. The controller devices may be accessible to user devices based on security credentials that are modified in real-time or near real-time.

The controller devices may receive (e.g., download) and store software that may be executed to install and run applications on the controller devices. The controller devices may utilize the software for controlling the distributed devices. The software may be managed and serviced for optimizing operation of the controller devices. The controller devices may access networks connecting the controller devices and the distributed devices to monitor, update, and control the distributed devices. The controller devices may be utilized to discover distributed devices being added to, or removed from, the networks. The controller devices may obtain distributed device information from the distributed devices. The controller devices may be geographically located within a proximity of the distributed devices to locally store the distributed device information. The distributed device information may include device identifiers, application data (also referred to herein as "an application" or "code" for "an application"), firmware data (also referred to herein as "firmware" or "code" for "firmware"), and configuration data (also referred to herein as "a configuration" or "code" for "a confirmation"). The controller devices may determine whether the distributed device information has been updated based on any changes associated the network and the distributed devices.

The controller devices may determine whether the distributed device information needs to be updated, based on whether any file integrity of any data (e.g., the application data, the firmware data, and/or the configuration data) has been corrupted (e.g., whether a file associated with the application data, the firmware data, and/or the configuration data includes any faulty storage media, errors in transmission, write errors created during copying or moving, software bugs, etc.). For example, to determine whether data integrity of the file has been corrupted, the controller devices may compare a current hash value of the file to a previous hash value of the file. If the current hash value matches the previous hash value, the file is presumed to be unmodified. Any hash value (e.g., the current hash value, the previous hash value, etc.) may be determined based on a cryptographic hash function and utilized to create a checksum file. The checksum file may be utilized to store, manage, and retrieve any data associated with the hash values, and compare the hash values (e.g., the current hash value and the previous hash value) of each of one or more of the files.

The controller devices may update the distributed device information, which may then be determined as update distributed device information, based on the changes (e.g., changes identified as having occurred, based on the current hash value not matching the previous hash value). The controller devices may modify the distributed device information by replacing the distributed device information with the updated distributed device information. The updated distributed device information may include updated information associated with distributed devices that were previously connected to the controller devices, distributed devices that remain connected to the controller devices, and/or distributed devices that are newly connected to the controller devices.

The portal devices, and/or devices (e.g., computing devices operated by users) and/or services, may connect to the controller devices and/or the distributed devices, via one or more service/cloud provider networks (sometimes referred to simply as a "cloud"). The service/cloud provider networks may span different geographic locations and connect different stand-alone networks. A "stand-alone network" may include networks that are external to the service provider network (e.g., at client-owned premises or client-managed data centers) and/or networks that include computing resources allocated within a service provider network on behalf of a user (e.g., a virtual private cloud (VPC)). Users of the service provider networks may utilize the portal devices to communicate with, configure, and manage the controller devices, via the cloud. The portal devices, and/or devices (e.g., computing devices operated by users) and/or services, may provide different input mechanisms to interact with the controller devices, such as a graphical user interface (GUI), a user interface (UI), a command line interface (CLI), an application programming interface (API), and the like.

The portal devices, and/or devices (e.g., computing devices operated by users) and/or services, may incorporate a set of resources that are be linked to the distributed devices using virtual private network (VPN) tunnels ("tunnels": also referred to herein as "communication channels") or connections that utilize portions of the public Internet. The controller devices may establish communication channels as temporary connections for communicating with the distributed devices. The portal devices and/or other computing devices may utilize the communication channels to monitor and control the controller devices, communicate with the controller devices, obtain information associated with the controller devices and the networks connecting the controller devices to the distributed devices, obtain information associated with the distributed devices, and monitor and control the distributed devices.

The controller devices may store security credentials utilized to safeguard the controller devices, the distributed devices, and the networks connecting the controller devices to the distributed devices, from being accessed or modified by unauthorized users. The controller devices may require submission of security credentials from users attempting to access the controller devices, via the portal devices. The security credentials provided by the users via the portal devices may be verified by the controller devices prior to granting or refusing access to the users. The controller devices may receive or generate different security credentials utilize to modify or replace the security credentials, in real-time or near real-time.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

FIG. 1 is an illustrative environment 100 that includes a controller device 102 in a workspace 104 that is configured to locally manage one or more distributed computing devices (hereinafter "distributed devices") within the workspace 104, in accordance with at least one embodiment. The controller device 102 may be any type of controller (e.g., an industrial programmable controller, a programmable logic controller (PLC), etc.) deploying a device management service 106 (hereinafter "service"). The service 106 may be utilized by the controller device 102 for managing the distributed device(s) (also referred to herein as "industrial device(s)," "peripheral device(s)," "gadgets," internet of things (IOT) devices," and "things"). For example, each of the distributed device(s) may be any auxiliary device capable of being communicatively coupled to the controller device 102. The terms "peripheral device(s)" and "distributed device(s)" may be used interchangeably throughout this disclosure. The distributed device(s) may be internal or external to the controller device 102. The distributed device(s) may include a computer and/or computer components with functionality (e.g., controlling a camera, robot, barcode scanner, interacting with a user, etc.) associated with the distributed device(s). The service 106 may be deployed by the software being received by, stored in, and executed by, the controller device 102. By executing the software, the controller device may install and run a device application of the service 106. The controller device 102 running the device application of the service 106 may perform operations for controlling the distributed devices. The controller device 102 running the application may communicate with, and provide support for, the distributed device(s). The service 106 may determine a resource to utilize for data backups (also referred to herein as "backups"), data restores (also referred to herein as "restores") for the distributed device(s), data upgrades (also referred to herein as "upgrades"), and data audits (also referred to herein as "audits"). For example, the resource may be a data storage resource, a database, a computing resource, a streaming resource, and/or a virtual or remote desktop or device, and/or any other type of computing resource.

The controller device 102 and the distributed device(s) may be positioned within the workspace 104. The workspace 104 including the controller device 102 and the distributed device(s) may be at an area (e.g., vicinity) within a perimeter of a portion of the environment. The workspace 104 may include an entire amount of the area (hereinafter "entire area") within the perimeter. However, the area within the perimeter may include the workspace 104 and one or more different workspaces. In some examples, the workspace 104 may include a partial amount of the area (hereinafter "partial area") within the perimeter. The partial amount of the area may be a single sub-portion of the area or more or more sub-portions of the area that are separated from each other by any of the different workspace(s).

The controller device 102 may store or have access to a device list (also referred to herein as registry) associated with the distributed device(s). The device list may include device numbers associated with the distributed device(s). The device numbers may be utilized by the controller device 102 to itemize the distributed device(s). The controller device 102 may determine and store distributed device information associated with the distributed device(s). The distributed device information may be combined with (e.g., integrated within or separate from) the device list. The distributed device information may include device identifiers (e.g., device media access control (MAC) addresses, device serial numbers, and/or device models), operation instructions, the application, the firmware, and the configuration. The distributed device information may be retrieved from the controller device 102, or obtained from an external device, based on the device numbers and/or the device identifiers.

The controller device 102 may determine whether to update the distributed device information based on any changes associated the network and/or the distributed device(s). The controller device 102 may determine a portion of the distributed device information to update, based on the changes. The controller device 102 may update, as updated information, the portion of the distributed device information. The portion may include some information (e.g., at least one of an identifier, operation instructions, the application, the firmware, or the configuration of a device) associated with any of one or more devices or all information (e.g., all of the identifier, the operation instructions, the application, the firmware, and the configuration) associated with any of the one or more devices. The controller device 102 may modify and replace the portion of the distributed device information with the updated information. The updated information may be associated with one or more distributed devices that were removed from the distributed device(s) (hereinafter "removed distributed device(s)"), one or more distributed devices that were previously among the distributed device(s) (hereinafter "previous distributed device(s)"), and/or one or more distributed devices that are newly added among the distributed device(s) (hereinafter "added distributed device(s)").

In some examples, a configuration associated with a distributed device that has been removed from being managed by the controller device 102 may be determined as erased information (e.g., an erased configuration). The controller device 102 removing the distributed device from being managed by the controller device 102 may include the controller device 102 disconnecting the distributed device from the controller device 102, deselecting the distributed device as a device being managed, updating the device list (e.g., remove a device number associated with the distributed device from the device list, deleting, from the device list, information indicating the device number is associated with and the distributed device, etc.), and/or setting or modifying a status indicator associated with the distributed device to be a disconnect status. In other examples, a configuration, which may be a new configuration associated with a distributed device previously added as being managed by the controller device 102 due to a new device being added as a distributed device, may be determined as an updated configuration based on the controller device 102 determining the updated configuration is newer than the new configuration. The controller device 102 adding the distributed device as being managed by the controller device 102 may include the controller device 102 connecting the distributed device from the controller device 102, selecting the distributed device as a device being managed, updating the device list (e.g., adding a device number associated with the distributed device from the device list, storing, in the device list, information indicating the device number is associated with and the distributed device, etc.), and/or setting or modifying a status indicator associated with the distributed device to be a connect status. The new configuration or the updated configuration may be determined as the erased configuration, based on the new device being disconnected from the controller device 102.

The controller device 102 may determine any configuration as an erased configuration, based on whether a device associated with the configuration has been removed. For example, the controller device 102 may determine whether any device (e.g., the device or the new device) has been removed based on the device being determined to be disconnected, determining whether the device has ceased to operate (e.g., inoperable due to a malfunction), determining whether the device has been disconnected by any user, determining whether the device has powered down, and/or controlling the device to power down based on a request input to the controller device 102 from the user, or on a request received from the server device or the computing device.

The controller device 102 may update the distributed device information by statically (e.g., manually) updating or dynamically updating the distributed device information. Statically updating the distributed device information may include updating the distributed device information, based on user instructions (e.g., instructions including a request) from a user. By way of example, the controller device 102 may periodically analyze and identify the distributed device(s) added to the controller device 102 to determine the changes in the network and/or the distributed device(s). The controller device 102 may determine the changes to notify (e.g., transmit a notification signal) the user of the distributed device(s) that were removed to the controller device 102 and/or the distributed device(s) that are newly added to the controller device 102.

The controller device 102 may transmit the notification signal to the user, based on an amount of time since the distributed device(s) were previously updated. The notification signal may be transmitted based on the amount of time meeting or exceeding a threshold amount of time. Dynamically updating the distributed device information may include updating the distributed device information, based on changes in the network and/or the distributed device(s) being sensed (e.g., automatically sensed) by the controller device 102. The distributed device information may be dynamically updated regardless of whether user instructions are received, subsequent to initial user instructions that request the distributed device information to be dynamic updated. The controller device 102 may sense the changes in the network and/or the distributed device(s) in real-time or near real-time, by identifying (e.g., actively sensing) connections between the pending distributed device(s) and the controller device 102. The controller device 102 may sense the changes by running a discovery mode and listen for packets on a network associated with the distributed device(s).

The controller device 102 may determine whether a new device is connected to the network, based on the packets. For example, for devices utilizing an ethernet protocol, the controller device 102 may receive address resolution protocol (ARP) requests and determine, based on characteristics of the ARP requests (e.g., ethernet framing, etc.), whether there is a new device connected to the network. If the controller device 102 determines, based on an ARP request, that there is a change in the network (e.g., a bar code scanner connected to the network changes an IP address of the bar code scanner to a new IP address), the controller device 102 may determine that the distributed device information needs to be updated, and may subsequently update the distributed device information based on the new device information (e.g., the new IP address associated with the bar code scanner). Additionally or alternatively, the controller device 102 may sense the changes by receiving device indications (e.g., passively sensing) from the distributed device(s) that were newly added or removed to the controller device 102 (e.g., any device indications received from the newly removed distributed device(s) being transmitted prior to removal). The distributed device information being dynamically updated may be based on the changes being sensed, and may include the distributed device information being updated without delay.

The controller device 102 may determine and store status indicators associated with the distributed device(s). The status indicators may be combined with (e.g., integrated within or separate from) the device list. The status indicators may be accessed based on the device numbers and/or the device identifiers. The status indicators may indicate statuses of whether the distributed device(s) are awaiting connection to, undergoing a process of being connecting to, in active connection with, in non-active (e.g., dormant or sleep) connection with, awaiting disconnection from, or undergoing a process of being disconnecting from, the controller device 102. The controller device 102 may store, as part of the device list, a pending device list associated with one or more pending distributed device(s) that are not currently being managed, but awaiting management, by the controller device 102. The pending device list may be combined with (e.g., integrated within or separate from) the device list. The distributed device information stored in the controller device 102 may be modified to include device information associated with pending distributed device(s) (hereinafter "pending device information"). The pending device information may include device identifiers, operation instructions, application, firmware, and the configuration associated with any of the pending distributed device(s). The pending device information may be combined with (e.g., integrated within or separate from) the device list.

The controller device 102 may determine whether to add the pending distributed device(s) to the previous distributed devices, by sensing the pending distributed device(s). The controller device 102 may discover pending distributed device(s) by running a discovery mode to sense the pending distributed device(s). Additionally or alternatively, the pending distributed device(s) may also run a discovery mode utilized for discovery, by the controller device 102, of the pending distributed device(s). The discovery mode may be ran based on an amount of time since a previous discovery mode was ran. The discovery mode may be ran based on the amount of time exceeding a threshold amount of time (e.g., 1 minute, 10 minutes, 100 minutes, etc.). The controller device 102 running the discovery mode, which may be a Bluetooth discovery mode, may search for every device within a range (e.g., 10 meters ("M")) of the controller device 102. The controller device 102 may receive messages (e.g., packets) transmitted by any device with the range. For example, the controller device 102 may receive messages broadcast by any device utilizing a process called advertising. The broadcast messages may include advertising packets, including information about the device that is advertising. The controller device 102 may find the advertising device by performing a scan (e.g., scanning or listening) for advertising packets and selecting any of the advertising packets that are received from devices. The devices from which the controller device 102 receives the packets may be determined based on a list of acceptable devices. The list may be stored in combination with (e.g., integrated within or separate from) the controller device 102. The controller device 102 may perform the scan, based on the controller device 102 being triggered for scanning. Triggering of scanning by the controller device 102 may be performed based on input from a user or a signal from a server device and/or computing device. The user may trigger the scanning by pressing a button of the controller device 102 or a device being utilized by an administrator or a user (e.g., the controller device(s) 304(1)-304(N), the computing device(s) 306(1)-306(N), or the server computer(s) 302(1)-302(M), as discussed below in the embodiment illustrated in FIG. 3). The controller device 102, based on discovering a device during scanning, may select a pending distributed device identifier presented with details of the pending distributed device that was discovered (e.g., the identifier and details may be presented by the controller device 102, the server device, and/or the computing device operated by the user). The pending distributed device may be selected from among many pending distributed devices being displayed via the device being utilized by the administrator or the user.

The controller device 102 may sense the pending distributed device(s) by identifying (e.g., actively sensing) connections between the pending distributed device(s) and the controller device 102. Additionally or alternatively, the controller device 102 may determine whether to add the pending distributed device(s) by receiving device indications (e.g., passively sensing) associated with the pending distributed device(s), the device indications being received from the pending distributed device(s) newly connected to the controller device 102. The controller device 102 may determine whether to add the pending distributed device(s), based on the pending distributed device(s) being sensed, by authenticating and/or authorizing the pending distributed device(s). The controller device 102 may add, as new distributed device(s), the pending distributed device(s) to the previous distributed devices, and may add, to the pending device list, status indicators of the new distributed device(s), based on the pending distributed device(s) being authenticated and/or authorized.

The distributed device information stored in the controller device 102 may include history information associated with the previous distributed device(s). The history information may be based on the controller device 102 determining connections were lost (e.g., discontinued, broken, etc.) between the controller device 102 and the previous distributed device(s). The controller device 102 may determine losses of the connections by receiving disconnect signals from the previous distributed device(s), the disconnect signals indicating the previous distributed device(s) are being, or have been, disconnected from the controller device 102. The controller device 102 may determine the losses of the connections by sending signals and determining responses (e.g., response signals) to the signals are not received from the previous distributed device(s). The controller device 102 may determine that the response (e.g., the response signals) were not received based on an amount of time since the signal was transmitted, and on the amount of time meeting or exceeding a threshold amount of time (e.g., 1 millisecond (ms), 1 second, 10 second, 100 second, etc.). The history information may include information about how or why the previous distributed device(s) were disconnected from the controller device 102. The history information may include times at which the connections were determined to be lost, disconnection statuses (e.g., information associated with reasons or causes of the disconnections), and previous information associated with the previous distributed devices. The previous information may include identifiers, operation instructions, application, firmware, and a configuration associated with one or more of the previous distributed device(s).

The controller device 102 may store the distributed device information associated with any of the distributed device(s) as discussed above, notwithstanding types of the distributed device(s) being different. In some examples, the stored information may vary based on aspects associated with the distributed device(s), including the types of the distributed device(s), how the distributed device(s) operate, functions of the distributed device(s), and/or characteristics of the distributed device(s). The characteristics may include purposes, requirements, and/or protocols of the distributed device(s). Although the stored information may be based on the aspects of the distributed device(s) as discussed above in this disclosure, it is not limited as such and may include the stored information being based on other device aspects associated with the distributed device(s).

The controller device 102 may utilize the distributed device information as backups for the distributed device(s). In some examples, a portion of the distributed device information may be received from the distributed device(s). The portion may include some information (e.g., at least one of an identifier, operation instructions, the application, or the configuration of a device) associated with any of one or more devices or all information (e.g., all of the identifier, the operation instructions, the application, and the configuration) associated with any of the one or more devices. A remaining portion not received from the distributed device(s) may be retrieved and/or obtained by the controller device 102, based on the received portion. In some examples, the remaining portion (e.g., at least one of the operation instructions, the application, or the configuration of a device) may be retrieved and/or obtained based on the received portion (e.g., at least one of the identifier). The remaining portion may be retrieved from a storage device of the controller device 102 or obtained from another device (e.g., an external device).

In some examples, the controller device 102 may perform a backup of firmware on the distributed device(s). In those examples, the distributed device information utilized for backup up the distributed device(s) may include, additionally or alternatively to the identifier, the operation instructions, the application, or the configuration of the device, the firmware of the distributed device(s). The controller device 102 may store the firmware in the storage device of the controller device 102. The controller device 102 may transmit the firmware to a portal device (e.g., a portal device 202, as discussed below in the embodiment illustrated in FIG. 2).

The controller device 102 may utilize the distributed device information stored as backups for the distributed device information (e.g., the distributed device information being utilized to restore the distributed device(s)) in case of an a change in service and/or operation (e.g., a power outage, a network outage, etc.) associated with the controller device 102 and/or the distributed device(s) 108. The controller device 102 may retrieve the distributed device information to restore the distributed device(s). The controller device 102 may transmit the retrieved distributed device information to the distributed device(s), including any updated information associated with any of the distributed device(s).

The controller device 102 may determine and/or receive new distributed device information as upgrades for the distributed device(s). In some examples, a portion (e.g., a partial amount or an entire amount) of the new distributed device information may be determined by the controller device 102 or received from a computing device (e.g., any of the computing device(s) 306(1)-306(P) as discussed below in FIG. 3A), and/or a server computer (e.g., any of the server computer(s) 302(1)-302 (M) as discussed below in FIG. 3A). The portion may include information including at least one of a new identifier, a new operation instruction, a new application, new firmware, or a new configuration of a device associated with any of one or more devices or all information (e.g., all of the identifier, the operation instructions, the application, the firmware, and the configuration) associated with any of the one or more devices).

The controller device 102 may utilize the distributed device information stored for audits for the distributed device information (e.g., the distributed device information being utilized to restore the distributed device(s)), based on a request from the computing device and/or the server computer. The controller device 102 may retrieve the distributed device information (e.g., at least one of an identifier, operation instructions, the application, the firmware, or the configuration of a device). The controller device 102 may retrieve the distributed device information from the device. The distributed device information may be retrieved by the controller device 102 transmitting a request to the device and receiving a response with the distributed device information. The controller device 102 may transmit (e.g., route) the distributed device information (e.g., any distributed device information that is most up to date, including the new distributed device information) to the computing device and/or the server computer.

In some examples, the controller device 102 may perform a restore of firmware on the distributed device(s). In those examples, the distributed device information utilized for restoring the distributed device(s) may include, additionally or alternatively to the identifier, the operation instructions, the application, or the configuration of the device, the firmware of the distributed device(s). The controller device 102 may receive the firmware from the portal device (e.g., a portal device 202, as discussed below in the embodiment illustrated in FIG. 2) and transmit the firmware to the distributed device(s) (e.g., a current distributed device, or a new distributed device (e.g., a replacement or upgraded distributed device for substitution of a current distributed device) added to the network and/or connected to the controller device 102). The controller device 102 may restore the distributed device information (e.g., the identifier, the operation instructions, the application, the configuration, or the firmware of the device) at regular intervals. For example, restoring by the controller device 102 may be performed based on an amount of time from a previous restoration meeting or exceeding a threshold amount of time.

In the example shown in FIG. 1, the distributed device(s) may include a first distributed computing device 108(1), a second distributed computing device 108(2), and a third distributed computing device 108(3). The first distributed computing device 108(1) may be a PLC associated with a camera 112. The first distributed computing device 108(1) may be configured to control the camera 112 to generate image data, based on an identifier (e.g., a PLC identifier), operation instructions (e.g., instructions regarding how to generate the image data), application data (e.g., data utilize to run software of the PLC), firmware data (e.g., data of firmware of the PLC), and a configuration (e.g., a PLC configuration) associated with the first distributed computing device 108(1).

The second distributed computing device 108(2) may be a robot controller associated with a robotic product packager 114. The second distributed computing device 108(2) may be configured to control the robotic product packager 114 to transport products to package preparation mechanisms utilized to package the products. The second distributed computing device 108(2) may control the robotic product packager 114, based on an identifier (e.g., a robot controller identifier), operation instructions (e.g., instructions regarding how to transport the products), application data (e.g., data utilize to run software of the robot controller), firmware data (e.g., data of firmware of the robot controller), and a configuration (e.g., a robot controller configuration) associated with the second distributed computing device 108(2).

The third distributed computing device 108(3) may be a human machine interface (HMI) usable by a user (e.g., an operator (also referred to herein as "human operator"), an administer (also referred to herein as "human administrator"), etc.). The third distributed computing device 108(3) may be configured to interface with the user 116 to input commands received from the user 116 and output responses to the user 116. The third distributed computing device 108(3) may be configured to interface with the user 116, based on an identifier (e.g., an HMI identifier), operation instructions (e.g., instructions regarding how to input commands and output responses), application data (e.g., data utilize to run software of the HMI), firmware data (e.g., data of firmware of the HMI), and a configuration (e.g., a HMI configuration) associated with the third distributed computing device 108(3).

Continuing with the example shown in FIG. 1, the pending distributed device(s) may include a pending distributed computing device 110. The pending distributed computing device 110 may be a barcode scanner controller associated with a barcode scanner 118. The pending distributed computing device 110 may be configured to control the barcode scanner 118 to scan a barcode, based on an identifier (e.g., a barcode scanner controller identifier), operation instructions (e.g., instructions regarding how to scan the barcode), application data (e.g., data utilize to run software of the barcode scanner controller), firmware data (e.g., data of firmware of the barcode scanner controller), and a configuration (e.g., a barcode scanner controller configuration) associated with the pending distributed computing device 110.

The pending distribution device(s) may be devices that are discoverable and/or that have been discovered by the controller device 102. Any of the pending distribution device(s) may be added as a distribution device, based on the pending distribution device sending out a broadcast signal, being discovered, by the controller device 102, and being added, by the controller device 102, as a distribution device. For example, the controller device 102 can initially recognize a discoverable distribution device as a pending distributed device (e.g., the pending distributed computing device 110), and then accept the pending distributed device and recognize the pending distributed device as a distribution device (e.g., a distributed device 108(4)).

Although the discovery mode of the controller device 102 may be the Bluetooth discovery mode, as discussed above in this disclosure, it is not limited as such and may include any wireless or wired discovery mode (e.g., wired ethernet, wireless ethernet, etc.). The controller device 102 may utilize the discovery mode (e.g., the wireless discovery mode or the wired discovery mode) of any type based on types of pending devices that are connectable to the controller device 102. Although the distributed device(s) include the distributed devices 108(1)-(3), and the pending distributed device(s) include the pending distributed device 110, as discussed above in this disclosure, it is not limited as such and may include any number (e.g., 10,000, 20,000, 100,000, etc.) of distributed devices of any types being managed by the controller device 102, and any number (e.g., 10, 100, 200, etc.) of pending distributed devices of any types awaiting management by the controller device 102.

By way of example, the distributed device(s) 108 may include a distributed device 108 of any type among various types, the types including a controller (e.g., a programmable controller (e.g., a PLC), a fixed function controller, etc.) associated with a device (e.g., an electronically controlled device) of any type (e.g., a camera, a sensor, etc.), a robotic controller associated with a robot of any type (e.g., a robotic product manager, a robotic drive sorter, etc.), an HMI associated with a user interface, etc. Although the controller device 102 and the distributed device(s) 108 are located in the workspace 104, as discussed above in this disclosure, it is not limited as such and may include the controller device 102 being in a different workspace than any of the distributed device(s) 108, the different workspace being in a same environment as the controller device 102. In other embodiments, the controller device 102 may be in different environment than any of the distributed device(s) 108 and in a same fulfillment center (FC) as any of the distributed device(s) 108. In other embodiments, the controller device 102 may be in different FC than any of the distributed device(s) 108 and in a same warehouse as any of the distributed device(s) 108.

Therefore, and as described herein, the controller device 102 is able to discover the distributed device 108. The controller device 102 may be operated in a discovery mode to receive broadcast signals from any device (e.g., any of the distributed device(s) 108 (e.g., the distributed device 108)), add the distributed device 108 as a managed device based on discovering the distributed device 108. The controller device 102 may manage (e.g., store, update, etc.) various types of data associated with the distributed device 108, including a device identifier, operation instructions, application data, firmware data, and/or a configuration of the distributed device 108. The device data being managed by the controller may be utilized to ensure the distributed device 108 is operating according to the most up-to-date data. The controller device 102 may store the device data as a back-up for the distributed device 108, in case of an occurrence of a change in service and/or operation (e.g., outages) associated with the controller device 102 and/or the distributed device(s) 108. The backup may be stored based on a health check performed by the controller device 102. The health check may be performed based on the scheduling information. The controller device 102 may send the device data to a portal device (e.g., a portal device 202, as discussed below in the embodiment illustrated in FIG. 2), which may use the data as a back-up. The portal device 202 may store the data and utilize the back-up to perform a restore for either or both of the controller device 102, and the distributed device 108 managed by the controller device 102, after any change in service.

The controller device 102 may remove any device (e.g., any of the distributed device(s) 108 (e.g., the distributed device 108)). The distributed device 108 being removed may be based on the distributed device 108 sending a signal to the controller device 102 to request disconnection, or on the controller device 102 determining the distributed device 108 was disconnected or is no longer connected. Signals may be exchanged between the controller device 102 and the portal device 202, and/or between the controller device 102 and a computing device (e.g., a computing device utilized by a user to access the controller device 102, via a communication channel established by the controller device 102). The signals transmitted by the controller device 102, and to the portal device 202, and/or the computing device (e.g., a computing device 306, as discussed below in the embodiment illustrated in FIG. 2), may include data associated with any of the functions being performed and/or requested. For examples, the signals may include device data having been obtained, device data having been replaced, device data needing to be updated due to a change in service and/or operation (e.g., outage) associated with the controller device 102 and/or the distributed device(s) 108, and/or device data needing to be replaced due to the device data being out of date and/or older than other device data. Any data (e.g., backup, restore, upgrade, audit, etc.) transmitted by the controller device 102 may be include data updated based on any device that was removed and/or added.

The controller device 102 may determine that one or more devices have been removed, added, and/or upgraded, and automatically update the distributed device data that is store in the controller device 102, when the controller device 102 detects the device(s) as having been removed, added, or upgraded. By automatically removing data associated with any device (e.g., any of the distributed device(s) 108) that becomes disconnected and utilizing the discovery mode to automatically discover any new device (e.g., any of the distributed device(s) 108), the controller device 102 in this disclosure improves upon existing systems that require manual entry and manual deletion of information associated with adding or removing devices. The controller device 102 may discover new devices and determine device data (also referred to herein as "distributed device information") (e.g., a device identifier, operation instructions, application data, firmware data, and/or a configuration) utilized for operation of the device. The controller device 102 may determine the device data by acquiring the device data from the discovered device, retrieve the device data from a storage device of the controller device 102 based on information received from the discovered device, and/or receive the device data from the portal device 202 and/or the computing device 306 communicating with the controller device 102. The controller device 102 utilizing the discovery mode to add new devices or automatically delete disconnected devices may prevent expensive and time-intensive data management requirements of existing systems that require manual entry for adding or removing any devices.

Moreover, the backup systems and processes described herein may solve one or more existing technological problems. For instance, the backup systems may include the controller device 102 that is positioned locally in a proximity of any device (e.g., any of the distributed device(s) 108). Because the controller device 102 is positioned locally, the controller device 102 is able to obtain up-to-date backups of the distributed device(s) 108 automatically and timely/frequently. The controller device 102 being positioned locally enables efficient and secure control of the distributed device(s) 108. Users may log into the controller device 102 to utilize the controller device 102 to gather information about the distributed device(s) 108, and manage data associated with the distributed device(s) 108. The controller device 102 can utilize and/or require entry of user security credentials that match device security credentials associated with the controller device 102. The device security credentials may be continually modified. The entry of the user security credentials may be utilized and/or required by the controller device 102 to authorize any user attempting to log into the controller device 102. The controller device 102 can require entry of the user security credentials prior to allowing the user to obtain access to the controller device 102. The device security credentials utilized by the controller device 102, and managed by the portal device 202 associated with the controller device 102, greatly increase security in comparison to existing systems, that only have weak security protection for managing, adding, and/or deleting devices to a network connected to existing devices.

Unlike weak or nonexistent security measures provided by existing controller devices that require burdensome installation of software to multiple devices associated with management of distributed devices, the controller device 102 in this disclosure utilizes a communication channel established by the portal device 202. The controller device 102 requires the communication channel to be established by authentication of security credentials provided by a user, prior to allowing access to the controller device 102 and/or the distributed device(s) 108 managed by the controller device 102.

The automatic backups obtained by the controller device 102 are significantly more efficient than backups obtained in existing systems. The automatic backups provided by the controller device 102 avoid large expenditures of manpower required by existing systems for manual backup of distributed devices.

The automatic backups obtained by the controller device 102 are significantly more accurate than backups obtained in existing systems. The controller device 102 is able to obtain backups of the distributed device(s) 108 as frequently as desired, to capture any updates made to the distributed devices, including any updated information based on a restore and/or an upgrade of the controller device 102 and/or any of the distributed device(s) 108. The ability to frequently obtain backups improves accuracy with respect to existing systems, due to backups of existing systems being automatically performed to conserve expensive resources and eliminate laborious and time consuming backups performed manually.

The backups obtained by the controller device 102 may be accurate and frequent, thereby minimizing system inefficiencies. The backups may be used for restoring device data of the controller device 102 and/or the distributed device(s) 108 to the most current versions after any changes in service and/or operation (e.g., outages) associated with the controller device 102 and/or the distributed device(s) 108. The controller device 102 prevents inaccuracies that are common in existing systems that resort to outdated backups to restore data after any of the changes in service and/or operation.

Figure 2:
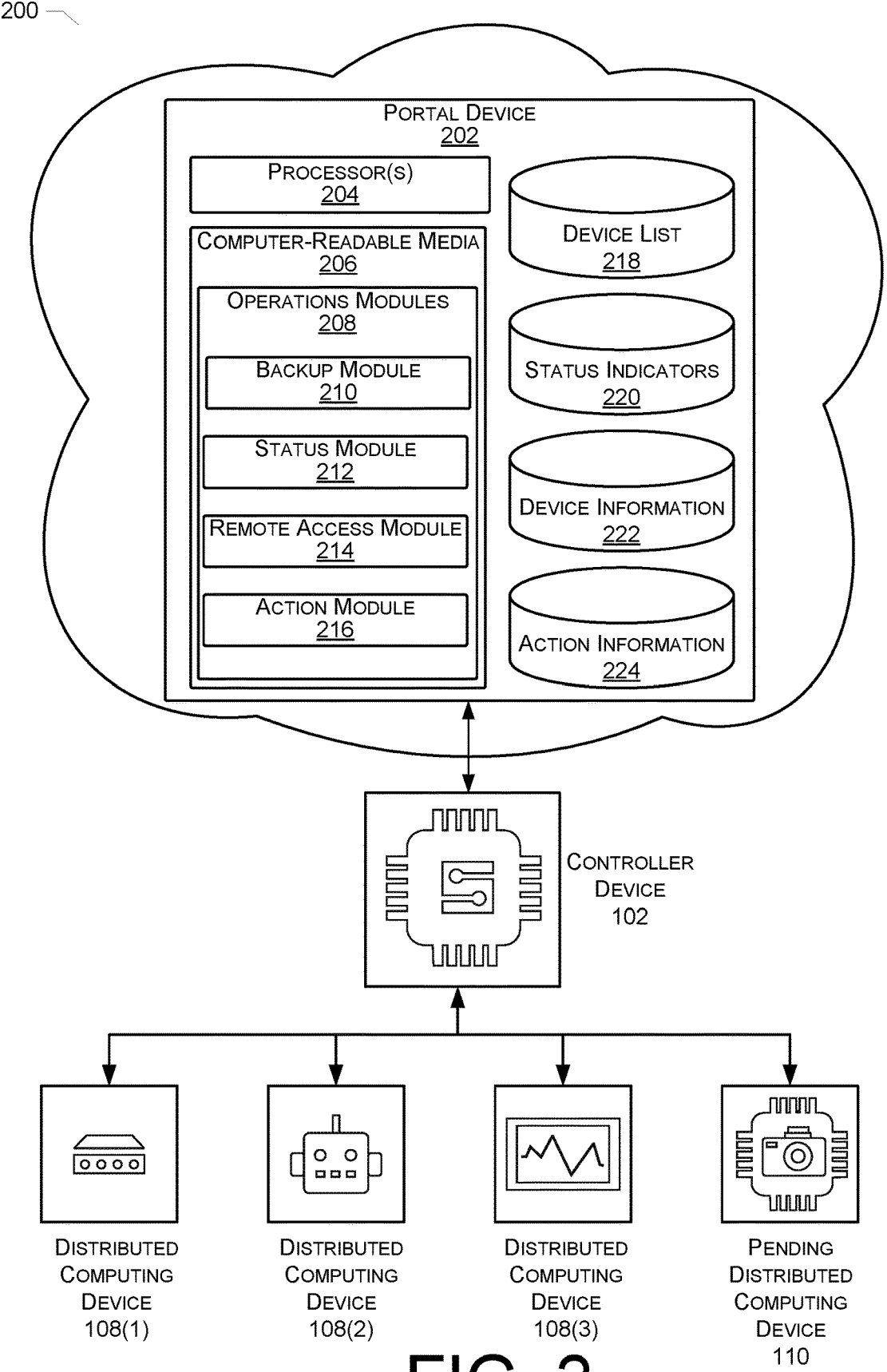
FIG. 2 is a system and network diagram that shows an illustrative operating environment that includes a controller device shown in FIG. 1, connected to a portal device, in accordance with at least one embodiment.

FIG. 2 is a system and network diagram that shows an illustrative operating environment 200 that includes the controller device 102 shown in FIG. 1, connected to a portal device 202, in accordance with at least one embodiment. As discussed above, the controller device 102 may retrieve distributed device information from a storage device in the controller device 102. Alternatively or additionally, as also discussed above, the controller device 102 may retrieve a portion of the distributed device information (e.g., at least one of an identifier, operation instructions, the application, the firmware, or the configuration) associated with the distributed device(s) 108, as discussed above in the embodiment illustrated in FIG. 1 from the distributed device(s) 108, and obtain a remaining portion of the distributed device information from an external device, the remaining portion including any portion (e.g., at least one of an identifier, operation instructions, the application, the firmware, or the configuration) not received from the distributed device(s) 108. Among other types of functionality, computing resources provided by the portal device 202, or by a larger system of which the portal device 202 is a part, can be utilized to implement various network services described herein. As also discussed above, the portal device 202 may be part of a larger system that provides the additional computing resources that include, without limitation, data storage resources, data processing resources, such as virtual machine (VM) instances, networking resources, data communication resources, network services, and other types of resources.

As briefly discussed above in the embodiment illustrated in FIG. 1, the controller device 102 may transmit the distributed device information to a user, based on user instructions. By way of example, the user instructions may include a request from a user for the distributed device information. In other examples, the user instructions may include a time period (e.g., an amount of time) for transmitting the distributed device information. By way of example, the controller device 102 may periodically analyze and identify any of the distributed device(s) 108 added to the controller device 102 to determine the changes in the network and/or the distributed device(s) 108. The controller device 102 may, based on the user instructions and any of one or more expirations of the time period, determine the changes to notify (e.g., transmit a notification signal) the user of any distributed device(s) 108 that were removed to the controller device 102 and/or any distributed device(s) 108 that were newly added to the controller device 102.

The controller device 102 transmitting the distributed device information to the user may include the distributed device information being transmitted to the portal device 202, which is accessible to the user. The portal device 202 may include one or more computing devices (e.g., one or more server computers 302(1)-302(M) discussed below in the embodiment illustrated in FIG. 3). Alternatively or additionally, the portal device 202 may include an application running on the server computer(s). The application may be utilized to control functions associated with a user interface (UI) of the server computer(s). The functions may include information being displayed via the UI and may include any information associated with the portal device 202 (e.g., functions including the distributed device information, which may include information about the distributed device(s) 108, information about the pending distributed device(s) (e.g., pending distributed device 110), history information about previous connected distributed device(s), etc.). The functions may further include user input information received from a user via input to the UI. For example, the received user input information may include requests for distributed device information.

The user input information may include scheduling information utilized to determine backups for the controller device 102, other controller devices, and/or the distributed device(s) 108. The user input information may include requests for restores for the controller device 102, other controller devices, and/or the distributed device(s) 108. The portal device 202 may provide and/or process any of the above discussed features, including features associated with backups and/or restores of the controller device 102, other controller devices, and/or the distributed device(s) 108, features associated with establish communication channels for communicating with any controller device, and/or features associated with security credentials. The security credentials may include device security credentials that are established for protection of the controller devices and/or the distributed device(s) 108, and/or user security credentials that are received via input from a user for establishing the communication channels.

The distributed device information being transmitted to the portal device 202 may include the controller device 102 transmitting the distributed device information, based on the user instructions being received from the portal device 202. By way of example, the controller device 102 may route the distributed device information to the portal device 202, in real-time or near real-time (e.g., upon receiving the distributed device information, the controller device 102 may transmit, without any delay, the distributed device information to the portal device 202). In other examples, the controller device 102 may transmit the distributed device information to the portal device 202, based on an amount of time since the distributed device(s) 108 were previously updated. The distributed device information may be transmitted based on the amount of time meeting or exceeding a threshold amount of time.

The portal device 202 may execute a portal service including network services, such as the data storage and data streaming, and/or provide computing resources, such as for backups, restores, upgrades, audits, and/or remote access utilizing communication channels (e.g., VPN tunnels), on a permanent or an as-needed basis. Among other types of functionality, the computing resources provided by the system, or by a larger system of which the system is a part, can be utilized to implement the various network services described herein. As also discussed above, the system may be part of a larger system that provides the additional computing resources that include, without limitation, data storage resources, data processing resources, such as virtual machine (VM) instances, networking resources, data communication resources, network services, and other types of resources The portal device 202 may connect to the controller device 102 via any type of network, such as the cloud, which may span different geographic locations and connect different stand-alone networks. The environment 200 may include one or more processors 204 and one or more computer readable media 206 that stores various modules, applications, programs, or other data. The computer-readable media 206 may include instructions that, when executed by the one or more processors 204, cause the processors to perform the operations described herein for the portal service.

Embodiments of the portal device 202 may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 206 may store operations modules 208. The operations modules 208 may include one or more portal module(s) (hereinafter "module(s)") of the portal service. The module(s) may include a backup module 210, a status module 212, a remote access module 214, and/or an action module 216, which are described in turn. The module(s) may be stored together or in a distributed arrangement. The computing architecture may include or have access to a device list (also referred to herein as "a device list database") 218, one or more status indicators (also referred to herein as "a status indicator database") 220, device information (also referred to herein as "a device information database") 222, and/or action information (also referred to herein as "an action information database") 224.

The backup module 210 may enable backup management for the controller device 102 and any of the distributed device(s) 108 connected to the controller device 102 (e.g., the distributed devices 108(1)-(3)). The backup module 210 may control the portal device 202 to receive, from the controller device 102, the device list (e.g., device list 218) and/or the distributed device information (e.g., device information 222). The device information 222 may include the updated information and the history information. The device information 222 and/or the device list 218 may be stored in the portal device 202. The portal device 202 may receive, based on the running the backup module 210, a no-change indication, based on the distributed device information not having not been changed since the distributed device information was previously transmitted by the controller device 102. Alternatively or additionally, in some examples, the portal device 202 may receive the distributed device information regardless of whether the distributed device information changed since the distributed device information was previously transmitted. In those examples, the portal device 202 may store, in a storage device of the portal device 202, an updated configuration within the received distributed device information.

The status module 212 may enable status management including auditing for peripheral devices (hereinafter "peripheral device auditing") (also referred to herein as distributed devices) for the controller device 102 and any of the distributed device(s) (e.g., the distributed device(s) 108) connected to the controller device 102. For example, the status module 212 may control the portal device 202 to receive the status indicators (e.g., status indicators 220) associated with the distributed device(s) 108, the status indicators being transmitted by the controller device 102 and to the portal device 202. The status indicators 220 may be stored in the portal device 202.

The status indicators 220 may be transmitted to the portal device 202, along with any other information associated with the distributed device(s) 108 (e.g., the device list 218 and/or the device information 222), for maintaining an up-to-date and accurate list of the distributed device(s) 108 connected to, and/or being managed by, the controller device 102. The controller device 102 and the portal device 202, by exchanging information for the peripheral device auditing, may synchronize information between both devices, and ensure that any information in the controller device 102 that has been updated in the controller device 102, but not in the portal device 202, may be transmitted and stored in the portal device 202. By synchronize information between both devices, and ensuring that information in the devices is similar, or identical, the portal device 202 may rapidly restore the controller device 102 and/or the distributed device(s) 108, after changes in service and/or operation (e.g., outages) that affects the controller device 102 and/or the distributed device(s) 108. For example, due to an occurrence of a change in service and/or operation (e.g., an outage (e.g., a partial or full outage associated with power or a network utilized by the controller device 102) that affects the controller device 102 and/or the distributed device(s) 108, a lack of network connectivity of the controller device and/or the distributed device(s) 108, network latency, insufficient network bandwidth, etc.,) that results in some or all of the information in the controller device 102 and/or any of the distributed device(s) 108 being lost (e.g., erased, degraded, disrupted, corrupted, etc.), the portal device 202 may restore the controller device 102 and/or the distributed device(s) 108 to full operation using current and up-to-date information (e.g., information in the controller device 102 and/or the distributed device(s) 108 that includes any changes, information in the controller device 102 and/or the distributed device(s) 108 also being provided, as backups, to the portal device 202, etc.). The portal device 202 may restore the controller device 102 and/or the distributed device(s) 108 to full operation by transmitting the current and up-to-date information to the controller device 102.

The controller device 102, for the peripheral device auditing, may receive any of the information from the controller device 102 (e.g., the device list 218, the status indicators 220, and/or the device information 222), and compare the received information to information stored within the controller device 102. For example, the controller device 102 may receive the device list 218 and compare any information within the received device list 218 to a device list stored within the controller device 102 (e.g., the device list 520, as discussed below in the embodiment illustrated in FIG. 5). For example, the controller device 102 may receive the status indicators 220 and compare any portion of the received status indicators 220 to status indicators stored within the controller device 102 (e.g., the status indicators 522, as discussed below in the embodiment illustrated in FIG. 5). For example, the controller device 102 may receive the device information 222 and compare any portion of the received device information 222 to device information stored within the controller device 102 (e.g., the device information 524, as discussed below in the embodiment illustrated in FIG. 5).

The remote access module 214 may enable interface management for the portal device 202, and/or any computing device (e.g., a computing device 306 discussed below in the embodiment illustrated in FIG. 3) utilizing the portal device 202. The interface management may be utilized to communicate with the controller device 102 and/or the distributed device(s) 108. For example, the remote access module 214 may be utilized to request the communication channel with the controller device 102 and/or the distributed device(s) 108. The request being generated and processed by the remote access module 214 may include the remote access module 214 transmitting a signal with security credentials (e.g., user security credentials), to the controller device 102.

The security credentials included in the signal may be provided by a user and to any computing device and/or the portal device 202. The security credentials may be associated with an administrator or a different individual (e.g., security credentials associated with the administer (hereinafter "administrator security credentials) and/or security credentials associated with a user (hereinafter "user security credentials")). The security credentials may be compared, by the controller device 102, to security credentials (e.g., device security credentials) stored in association with the controller device 102. The device security credentials may be included in a plurality of different device security credentials, each of the device security credentials being periodically modified or replaced in real-time or near real-time. The device security credentials may be established by the administrator or the different individual via input to the controller device 102, via input to a computing device (e.g., the computing device(s) 306(1)-306(P), as discussed below in the embodiment illustrated in FIG. 3) communicating instructions for determining the device security credentials to the controller device 102, or via input to a server device (e.g., the server computer(s) 302(1)-302(M), as discussed below in the embodiment illustrated in FIG. 3) communicating instructions for determining the device security credentials to the controller device 102.

The security credentials may include a username and a password associated with the administrator or the user. The security credentials may be different for the administrator or the user, to provide access at different levels (e.g., the security credentials for the administrator may be associated with a level of access that is higher than for the security credentials for the user). The security credentials may be utilized as information for obtaining a security token for accessing the controller device 102, via a communication channel. The security credentials may be longer-lived than security tokens, and utilized for obtaining, from the computing device(s) 306(1)-306(P) or the server computer(s) 302(1)-302(M), a security token granting access of a runtime manifestation of the security credentials to the user, for establishing the communication channel. The user, based on the security credentials and/or the security token, may communicate with the controller device 102 to exchange any of the information, as discussed herein. For example, the user may communicate with the controller device 102 to exchange any of the information, based on authentication of the security credentials by determining whether the security credentials received from the computing device(s) 306(1)-306(P) or the server computer(s) 302(1)-302(M) match the security credentials stored in the controller device 102.

The action module 216 may be utilized for any actions (e.g., functions) performed by the portal device 202. For example, the actions module 216 may include actions (e.g., miscellaneous actions) including for upgrades, audits, etc. The actions module 216 may perform the miscellaneous actions based on data and/or instructions that are associated with the actions and stored in the action information database 224.

Although the various types of information are transmitted to the server computer(s) 302(1)-302(M), as discussed above in this disclosure, it is not limited as such and any of the information of any type being transmitted to the server computer(s) 302(1)-302(M) may be transmitted to a computing device (e.g., the computing device(s) 306(1)-306(P) discussed below in the embodiment illustrated in FIG. 3, via the server computer(s) 302(1)-302(M), and/or to another portal device (e.g., another portal device communicatively connected to the controller device 102, or to another controller device in the environment 200 or another environment).

Figure 3A:
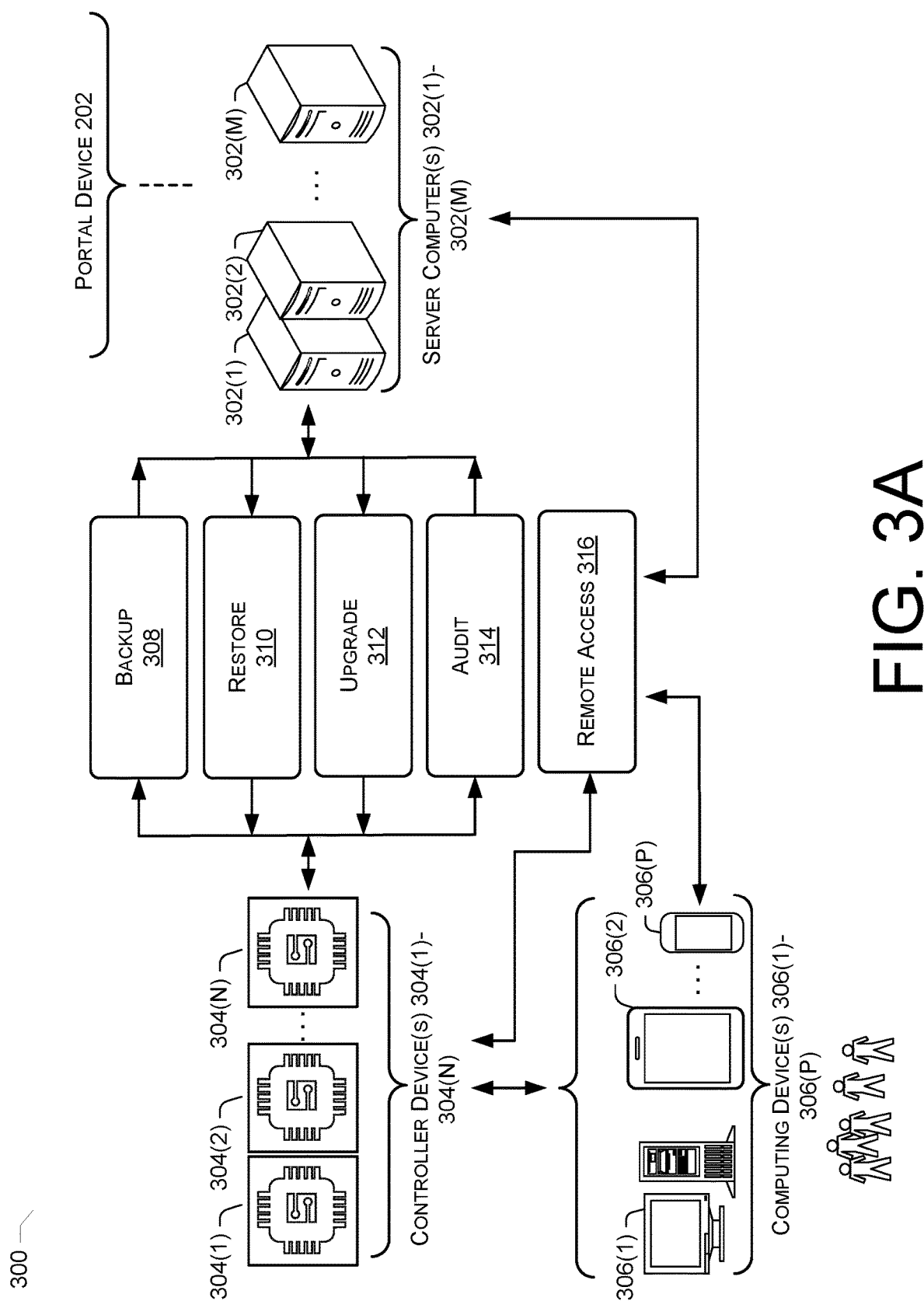
FIGS. 3A and 3B illustrate example environments including one or more server computers configured to communicate with one or more controller devices.
Figure 3B:
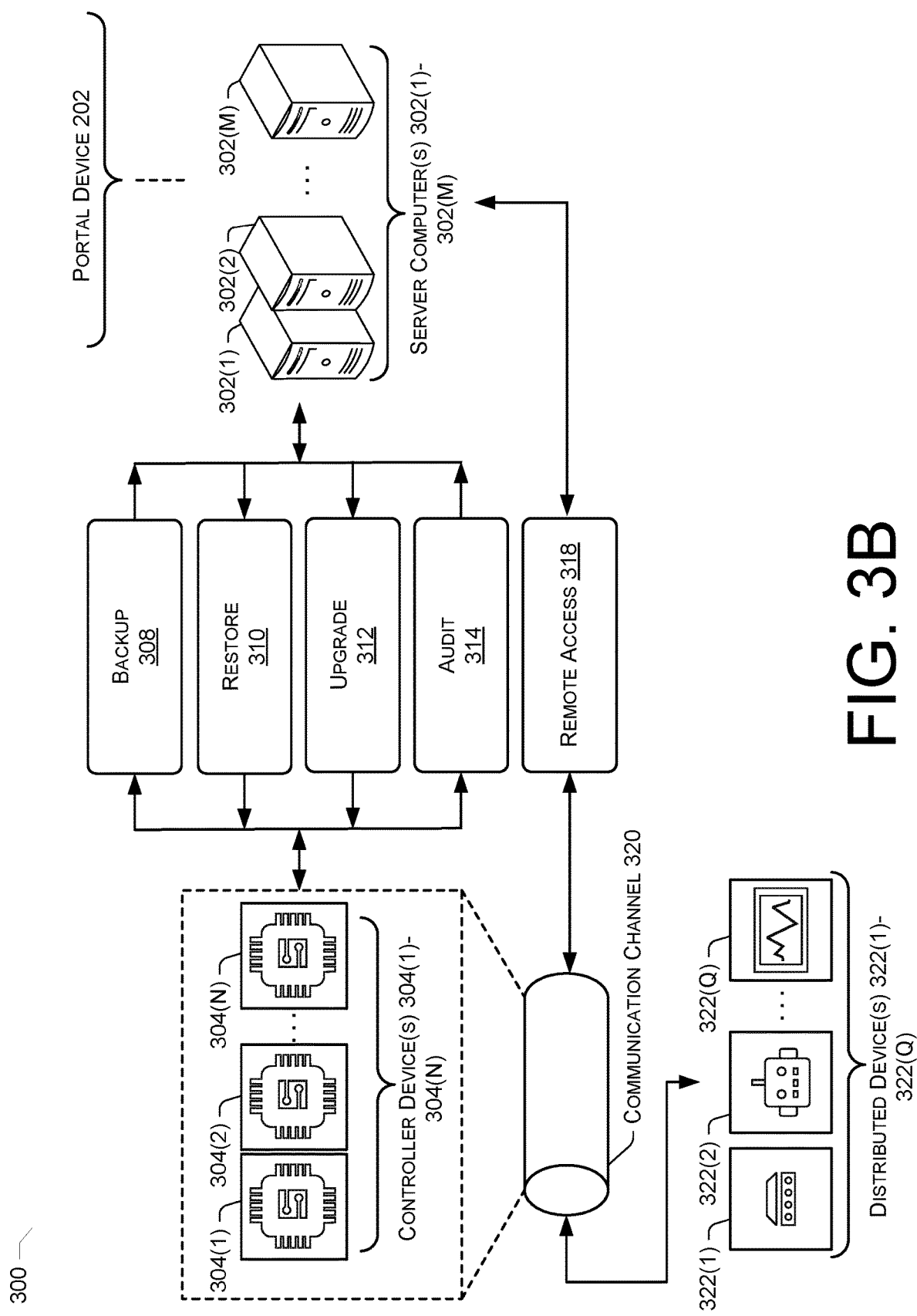

FIGS. 3A and 3B illustrate example environments 300 including one or more server computers 302(1)-302(M) configured to communicate with one or more controller devices 304(1)-304(N). FIG. 3A illustrates the example environment 300 including the server computer(s) 302(1)-302(M) configured to communicate with the controller device(s) 304(1)-304(N) and one or more computing device 306(1)-306(P). Any of the controller device(s) 304(1)-304(N) may be utilized to implement the controller device 102 shown in FIG. 1.

As also discussed above in the embodiment illustrated in FIG. 2, computing resources provided by the portal device 202, or by the larger system of which the portal device 202 is a part, can be utilized to implement various network services described herein. As also discussed above, the portal device 202 may be part of the larger system that provides the additional computing resources that include, without limitation, data storage resources, data processing resources, such as virtual machine (VM) instances, networking resources, data communication resources, network services, and other types of resources. The system of which the portal device 202 is a part may include the server computers 302(1)-302(M). The server computers 302(1)-302(M) may operate interactively with the computing device(s) 304(1)-304(P) and the controller device(s) 304(1)-304(N) to enable the portal device 202 to provide computing resources, such as for backups, restores, upgrades, audits, and/or the remote access.

In order to enable the portal device 202 to provide the computing resources, the server computers 302(1)-302(M) and the controller device(s) 304(1)-304(N) may perform a backup 308, a restore 310, an upgrade 312, and/or an audit 314. The server computers 302(1)-302(M) may perform the backup 308 by receiving backup information from the controller device(s) 304(1)-304(N). The backup information may include the device list 214, the status indicators 220, and/or the device information 222. The server computers 302(1)-302(M) may store the backup information in a storage device (e.g., the computer-readable media 206) of the server computers 302(1)-302(M), the backup information being stored as the status indicators 220, and/or the device information 222. The server computers 302(1)-302(M) may transmit a threshold amount of time (e.g., an indicator including a value of the threshold amount of time) to the controller device(s) 304(1)-304(N) that is utilized by the controller device(s) 304(1)-304(N) for transmitting the backup information. The threshold amount of time may be stored in the controller device(s) 304(1)-304(N) and utilized by the controller device(s) 304(1)-304(N) to transmit the backup information, based on an amount of time since the backup information was previously transmitted. The controller device(s) 304(1)-304(N) may transmit the backup information when the amount of time since a previous backup meets or exceeds the threshold amount of time.

The backup information may include a device list 214 (e.g., the device list 214), status indicators (e.g., the status indicators 220), and/or device information (e.g., the device information 222). For example, the backup information may include, in combination with (e.g., integrated within or separate from) the device list, device numbers associated with the distributed device(s) (e.g., the distributed device(s) 108, as discussed above in the embodiment illustrated in FIGS. 1 and 2). The device numbers may be determined by the controller device(s) 304(1)-304(N) sequentially as devices are added to the a controller device 304, based on a time at which a device (e.g., a pending device subsequently added as a device being managed) is discovered, or a time at which a device (e.g., a device being managed) is added as a managed device, by the controller device 304. For example, the device numbers may be determined based on an order in which the distributed device(s) 108 are added as devices being managed by the controller device 304, or an order in which pending distributed device(s) (e.g., the pending distributed device 110, as discussed above in the embodiment illustrated in FIGS. 1 and 2) that are subsequently added as managed distributed device(s) 108 are discovered.

The status indicators in the backup information may include, in combination with (e.g., integrated within or separate from) the status indicators, indicators indicating statuses of the distributed device(s) 108. The statuses may include a pending status, indicating that a device has been discovered but not added as a managed device. The statuses may include an active status, indicating that a device has been added as a managed device, and is currently being managed by the controller device(s) 304(1)-304(N). The statuses may include a non-active (e.g., dormant or sleep) status, indicating a device is being managed by the controller device(s) 304(1)-304(N) but not operating, or operating at a reduced capacity (e.g., operating with less than all of the functions of the device). The statuses may include an awaiting disconnection status, indicating a device has requested (e.g., sent a request signal) disconnection from the controller device(s) 304(1)-304(N) and is awaiting disconnection from, or undergoing a process of being disconnected from, the controller device(s) 304(1)-304(N).

The device information in the backup information may include, in combination (e.g., integrated within or separate from) with the device information, device identifiers (e.g., device media access control (MAC) addresses, device serial numbers, and/or device models), operation instructions, application data, and configurations.

The server computers 302(1)-302(M) may perform the restore 310 by transmitting restore information to the controller device(s) 304(1)-304(N). The restore information may be provided to the controller device(s) 304(1)-304(N) based on a change in service and/or operation associated with the controller device(s) 304(1)-304(N) and/or the distributed device(s) 108, to bring the controller device(s) 304(1)-304(N) back into the same operation as before the change in service and/or operation, and/or to enable the controller device(s) 304(1)-304(N) to bring the distributed device(s) 108 back into the same operation as before the change in service and/or operation. The change in service and/or operation may include any outage among outages of various types. The outages of various types may include outages (e.g., disruptions and/or losses) in power, network communication, and/or an operations associated with device functions (e.g. memory/storage functions, processing functions, etc.), affecting any of the controller device(s) 304(1)-304(N) and/or any of distributed device(s) 108. The changes in service and/or operation affecting any of the controller device(s) 304(1)-304(N) and/or any of distributed device(s) 108 may be partial outages of any of the devices, full outages of any of the devices, or any combination thereof.

By setting the amount of time for perform the backup 308 and receiving the backup information from the controller device(s) 304(1)-304(N), the server computers 302(1)-302(M) can ensure that the restore information provided via the restore 310 after an occurrence of the change in service and/or operation is as accurate as possible. The accuracy of the restore information provided via the restore 310 after the occurrence of the change in service and/or operation may be ensured, based on the backup information being transmitted by the controller device(s) 304(1)-304(N) as recently as possible (e.g., within the shortest amount of time possible) prior to the change in service and/or operation. By setting a first threshold amount of time to be less than a second threshold amount of time, the server computers 302(1)-302(M) may the increase a likelihood of first backup information being received based on the first threshold amount of time capturing any updated information in comparison to second backup information being received based on the second threshold amount of time.

As a hypothetical example, the backup information may be stored in server computers 302(1)-302(M) and may include a configuration and/or an application associated with a camera. The backup information in the server computers 302(1)-302(M) may be updated based on a new configuration and/or a new application associated with the camera being determined or set by a user. The new configuration might include settings associated with operation of the camera being adjusted to change resolution of images being captured by the camera, to improve clarity of objects being captured in images taken by the camera. Alternatively or additionally, the new application may include improved application to provide access to previously unused capabilities of the camera, or to improve quality of images captured by the camera. The backup information with the new configuration and/or the new firmware, initially stored in the controller device(s) 304(1)-304(N), may be transmitted to the server computers 302(1)-302(M) based on schedule information set by a user. The schedule information may be utilized to automatically transmit the backup information, to protect the backup information from being lost due to a change in service and/or operation associated with the controller device(s) 304(1)-304(N) and/or the distributed device(s) 108.

The server computers 302(1)-302(M) may receive backup information (e.g., current backup information) from the controller device(s) 304(1)-304(N). The server computers 302(1)-302(M) may retrieve backup information (e.g., previous backup information) from a storage device in the server computers 302(1)-302(M), or from other computing devices (e.g., other server computers). The server computers 302(1)-302(M) may request comparison information (e.g., a result of a comparison) associated with the backup information, the comparison information being determined by, and received from, the controller device(s) 304(1)-304(N). The server computers 302(1)-302(M) may receive the comparison information, from the controller device(s) 304(1)-304(N). The comparison information may be transmitted by the controller device(s) 304(1)-304(N), based on the controller device(s) 304(1)-304(N) determining that at least a portion of the current backup information is different from at least a portion the previous backup information.

Alternatively or additionally, the server computers 302(1)-302(M) may receive the comparison information from the controller device(s) 304(1)-304(N), based on a time (e.g., capture time) at which the current backup information was captured by the controller device(s) 304(1)-304(N). The captured current backup information may be current backup information that is received by the controller device(s) 304(1)-304(N) and from the distributed device distributed device(s) 108. For example, the comparison information may be received from the controller device(s) 304(1)-304(N), based on the controller device(s) 304(1)-304(N) determining the capture time meets or exceeds a threshold time from when the previous backup information was captured by the controller device(s) 304(1)-304(N) and from the distributed device distributed device(s) 108. Alternatively or additionally, the server computers 302(1)-302(M) may receive the comparison information from the controller device(s) 304(1)-304(N), based on a time (e.g., transmission time) at which the current backup information was transmitted by the controller device(s) 304(1)-304(N) and to the server computers 302(1)-302(M). For example, the comparison information may be received based on the controller device(s) 304(1)-304(N) determining the transmission time meets or exceeds a threshold time from when the previous backup information was transmitted by the controller device(s) 304(1)-304(N) and to the server computers 302(1)-302(M).

The server computers 302(1)-302(M) may determine, based on the comparison information indicating that there are changes between the previous backup information and the current backup information, and on the times indicating the current backup information is the most current (e.g., up-to-date) and accurate information, that the current backup information is to be utilized as restore information. By utilizing the comparison information, the most up-to-date and accurate backup information may be determined as the restore information. In some examples, alternatively to the comparison information, an indication that no change between the previous backup information and the current backup information was detected may be received. The indication may be received by the server computers 302(1)-

302(M) and from the controller device(s) 304(1)-304(N), based on the indication being detected by the controller device(s) 304(1)-304(N). By storing and/or transmitting the indication instead of the comparison information, storage costs associated with the controller device(s) 304(1)-304(N) may be reduced.

Moreover, the server computers 302(1)-302(M) may transmit restore information to the controller device(s) 304(1)-304(N), based on an indication received by the server computers 302(1)-302(M) and from the controller device(s) 304(1)-304(N). The indication may be transmitted by the controller device(s) 304(1)-304(N), based on the controller device(s) 304(1)-304(N) determining that the previous backup information is to be utilized as the restore information. The controller device(s) 304(1)-304(N) may determine the previous backup information is to be utilized as the restore information, based on the comparison information indicating the current backup information is identical, or substantially identical in all but trivial aspects, to the previous backup information. By utilize the previous backup information as the restore information, based on the comparison information indicating that there are no substantial differences between the current backup information and the previous backup information, processing resources otherwise utilized to update the restore information by replacing the previous backup information with the current backup information may be conserved. The conserved processing resources may be reallocated for other computational purposes.

The server computers 302(1)-302(M) may determine an occurrence of a change in service and/or operation associated with the controller device(s) 304(1)-304(N) and/or the distributed device(s) 108. The server computers 302(1)-302(M) may then provide restore information to the controller device(s) 304(1)-304(N). After the change in service and/or operation associated with the controller device(s) 304(1)-304(N) and/or the distributed device(s) 108, the server computers 302(1)-302(M) may retrieve backup information (e.g., stored backup information) from a storage device in the server computers 302(1)-302(M). The server computers 302(1)-302(M) may transmit, as restore information, the stored backup information to the controller device(s) 304(1)-304(N) to restore the controller device(s) 304(1)-304(N), as well as distributed device(s) 108 being managed by the controller device(s) 304(1)-304(N).

Although features (e.g., the backup 308, the restore 310, the upgrade 312, and/or the audit 314) may be performed for the controller device(s) 304(1)-304(N) and the server computers 302(1)-302(M) as discussed above in this disclosure, it is not limited thereto and any of these features may be performed by, instead of the controller device(s) 304(1)-304(N), any controller device in another workspace and/or environment, and, instead of the server computers 302(1)-302(M), any server computer in another workspace and/or environment or any computing device (e.g., any of the computing device(s) 306(1)-306(P)).

The restore information may include any portion of the backup information that was stored in the server computers 302(1)-302(M) as the device list 214, the status indicators 220, and/or the device information 222. The portion of the backup information provided, as the restore information and to the controller device(s) 304(1)-304(N), may include a portion that was requested by the controller device(s) 304(1)-304(N). The portion of the backup information provided, as the restore information and to the controller device(s) 304(1)-304(N), may include less than all, or all, of the backup information.

The server computers 302(1)-302(M) may perform the upgrade 312 by transmitting upgrade information to the controller device(s) 304(1)-304(N). The upgrade 312 may be performed in a similar way as discussed above for the restore 310, except with the upgrade information utilized to replace any information in the controller device(s) 304(1)-304(N) and/or the distributed devices 108. The upgrade information may include new operation instructions, new application data, new firmware data, and/or new configurations. The upgrade information may be stored by the controller device(s) 304(1)-304(N) and/or the distributed devices 108.

The server computers 302(1)-302(M) may perform the audit 314 by receiving audit information from the controller device(s) 304(1)-304(N). The audit information may be provided to the server computers 302(1)-302(M) in a similar way as discussed above for the backup 308. The audit information may include any portion (e.g., a partial amount or entire amount) of information provided in the backup information, as discussed above. The audit information received by the server computers 302(1)-302(M), which may display, store, and/or analyze the audit information. For example, the server computers 302(1)-302(M) may compare the audit information to any backup information or other audit information that was previously received, or compare the audit information to other information (e.g., information stored by the server computers 302(1)-302(M), information retrieved by the server computers 302(1)-302(M) from any external device, any restore information, any upgrade information, etc.). The audit information may be utilized by the server computers 302(1)-302(M) to determine whether to perform the backup 308, the restore 310, and/or the upgrade 312.

The computing device(s) 306(1)-306(P) may transmit one or more remote access request(s) associated with remote access 316 to the server computers 302(1)-302(M). The request(s) associated with remote access 316 may be transmitted by the computing device(s) 306(1)-306(P) and received by the server computers 302(1)-302(M), to establish communication channels between the computing device(s) 306(1)-306(P) and the controller device(s) 304(1)-304(P). For example, the server computers 302(1)-302(M) may receive an access request associated with remote access 316 from a computing device 306(1), associated with a controller device 304(1). The server computers 302(1)-302(M) may receive the access request associated with remote access 316 that includes a controller device identifier associated with the controller device 304(1). Any access request (e.g., the access request associated with remote access 316) may be transmitted by a computing device (e.g., computing device 306(1)) to request remote access 316, via a communication channel between the computing device 306(1) and a controller device (e.g., the controller device 304(*a*)), a communication channel between a server computer 302(*i*) and the controller device 304(*a*), and/or a communication channel between the server computer 302(*i*), the controller device 304(*a*), and the computing device 306(1). The access request may be transmitted to utilize the communication channel to exchange information between the server computer 302(*i*), the computing device 306(1), and/or the controller device 304(*a*) (e.g., transmit information from a controller device 304 and to a computing device 306, or vice versa: or transmit information from a controller device 304 and to a server computer 302, or vice versa). The exchanged information may include any device information determined by the controller device 304(*a*), the computing device 306(1), and/or a server computer (e.g., a server computer 302(1)). The device information may include device identifiers, application data, firmware data, and configurations.

In some examples, the exchanged information may include a configuration determined by the controller device 304(a) and transmitted to the computing device 306(1) and/or the server computer 302(i). The configuration may be determined by the controller device 304(a) as an updated configuration to replace another configuration for a previous device or a new device.

In some example, the exchanged information may include a configuration determined by the computing device 306(1) and/or the server computer 302(i) and transmitted to the controller device 304(a). The configuration may be determined by the computing device 306(1) and/or the server computer 302(i) as an updated configuration to replace another configuration for a previous device or a new device. The configuration, being determined by the computing device 306(1) and/or the server computer 302(i), may be determined for a distributed device 108 based on a similar configuration for other distributed devices (e.g., any of the distributed device(s) 108, or other distributed devices connected to the controller device 102 or other controller devices) that are similar or identical to the distributed device 108. The configuration, being determined by the computing device 306(1) and/or the server computer 302(1), may be input by a user to the computing device 306(1) and/or the server computer 302(i). The configuration, being determined by the computing device 306(1) and/or the server computer 302(i) according to any processed discussed above, may be determined based on any portion of the device information (e.g., one or more of device identifier(s), application data, firmware data, and configuration(s)) associated with the distributed device 108, and/or any other device information including device identifiers, application data, firmware data, and configurations of other device identifiers being managed by the controller device 304(a).

In some examples, the exchanged information including the configuration determined by the computing device 306(1) and/or the server computer 302(i), may be based on a request transmitted by the controller device 304(a) (e.g., a request automatically transmitted by the controller device 304(a), based on scheduling information stored in the controller device 304(a), the scheduling information being received from the computing device 306(1) and/or the server computer 302(1), via input from the user).

The scheduling information may include a time period (e.g., 1 ms, 1 second, 5 seconds, 10 seconds, 1 minute, 1 day, 10 days, 100 days, etc.) associated with transmission, to the portal device 202, of information (e.g., distributed device information, which may include device identifiers (e.g., device media access control (MAC) addresses, device serial numbers, and/or device models), operation instructions, application data, firmware data, and configurations) associated with the controller device 102. The information transmitted based on the scheduling information may be utilized by the portal device 202 to restore distributed device information of the controller device 102 in an event of a change in service and/or operation associated with the system (e.g., the controller device 102 and/or the distributed device(s) 108). By way of example, the controller device 102 may transmit, as an initial transmission, distributed device information (e.g., initial distributed device information) at a transmission time. The controller device 102 may, based on an amount of time since the transmission time meeting or exceeding a threshold amount of time (e.g., the time period included in the scheduling information), transmit, to the portal device 202, new distributed device information (e.g., the same distributed device information as the initial distributed device information based on no changes having been made to the initial distributed device information since the initial transmission, or modified distributed device initial based on changes having been made to the initial distributed device information since the initial transmission).

In some examples, the exchanged information including a configuration determined by a computing device 306 and/or a server computer 302, may be based on information received by the computing device 306 and/or the server computer 302, the received information being input by the user to the computing device 306 and/or the server computer 302. In some examples, the exchanged information including the configuration determined by the computing device 306 and/or the server computer 302, may be based on the scheduling information stored in computing device 306 and/or the server computer 302. In some examples, the exchanged information including the configuration determined by the computing device 306 and/or the server computer 302, may be based on information received by the computing device 306 and/or the server computer 302, the received information being received from another controller device, another computing device, or another server computer.

The controller device 304(a) may compare any information (e.g., current information (e.g., device identifiers, application data, firmware data, and configurations)) received from any other device (e.g., any other controller device, any computing device, or any server computer) with previous information (e.g., device identifiers, application data, firmware data, and configurations) stored in the controller device 304(a). The controller device 304(a) may determine, based on the comparison, whether the received information is more current than previous information.

The controller device 304(a), to determine whether the received information is more current than previous information, may compare the received information and distributed device information that was previously transmitted, to determine a result indicating whether there was a change in the distributed device information. The controller device 304(a) may transmit a notification signal to a user indicating that there was a change, or no change, in the distributed device information, based on the comparison result. By way of example, the controller device 304(a) may store, in a storage device of the controller device 304(a), an updated configuration within the received distributed device information. To determine whether to store the updated configuration, the controller device 304(a) may perform a comparison to determine whether the updated configuration is different from a previous configuration (e.g., a previous configuration including a new configuration associated with an added device) and may determine whether to store the updated configuration based on the comparison. The comparison may include comparing a hashed value associated with the current distributed device information and a hashed value associated with the previous distributed device information, performing a checksum associated with the current distributed device information and the previous distributed device information, etc.

The controller device 304(a) may transmit a signal to the computing device 306(1) and/or the server computer 302(i), based on determining the updated configuration is different from the previous configuration (e.g., determining the previous configuration has been modified) and/or based on the comparison. The signal may include the comparison information (e.g., a result of the comparison (e.g., a comparison indicator)).

The controller device 304(*a*) may refrain from updating the stored information if the received information is not as current (e.g., up-to-date) as the stored information. Or, the controller device 304(*a*) may update the stored information if the received information is more current (e.g., up-to-date) than the previous information stored. The controller device 304(*a*) may utilize the stored information, which is the most current information (e.g., initial information and/or any information updated by the upgrade information via the upgrade 312), for backups, restores, upgrades, and/or audits of the controller device 304(*a*) and any managed device of the distributed device(s) 108. The controller device 304(*a*) may transmit the stored information to the computing device 306(1) and/or the server computer 302(*i*), so that the transmitted information may be returned to restore the controller device 304(*a*) after an occurrence of a change in service and/or operation associated with the controller device(s) 304(1)-304(N) and/or the distributed device(s) 108.

Any of the controller device 304(*a*), the computing device 306(1), and/or the server computer 302(*i*) may transmit a signal to the other devices, based on device information (e.g., may include device identifiers, application data, firmware data, and configurations) being received. For example, the controller device 304(*a*) may receive the device information (e.g., a configuration for a new device or an updated configuration for a current device) from one or more other devices (e.g., one or both of a computing device 306(1) and a server computer 302(*i*)), and may transmit a signal to at least one of the other devices (e.g., a computing device 306(1) and/or a server computer 302(*i*)) indicating the current information (e.g., a received configuration) was received and/or utilized to replace stored information (e.g., a stored configuration) for a device.

The controller device 304(1) may receive a request (e.g., remote access request for remote access 316) for a communication channel. The controller device 304(1) may establish the communication channel, based on the request. The request may be received by the controller device 304(1), and from the server computer 302(*i*) or the computing device 306(1). The server computer 302(*i*) and/or the computing device 306(1) may communicate utilizing the communication channel, based on the controller device identifier. The controller device 304(1) may establish the tunnel with the computing device 306(1) and/or the server computer 302(*i*), further based on security credentials as discussed above in the embodiment illustrated in FIG. 2. The controller device 304(1) may establish the communication channel further based on the security credentials being validated as authentic user credentials. The server computer 302(*i*) or the computing device 306(1) utilizing the communication channel may be any type of device (e.g., a secure socket layer (SSL)-enabled device) with capabilities for establishing the communication channel. The communication channel may be secure and may have a security protocol (e.g., an SSL protocol, a transport layer security (TLS) protocol, a swipe IP security protocol (swIPe) protocol, a secure remote procedure call (S-RPC) protocol, a secure electronic transaction (SET) protocol, and/or a password authentication protocol (PAP)). The controller device 304(1) may receive the request (e.g., remote access request associated with remote access 316) for the communication channel and send back an identification associated with the controller device 304(1), the identification being a digital certificate. The digital certificate may include a device name associated with the controller device 304(1), a trusted certificate authority (CA), and/or a public encryption key associated with the controller device 304(1).

The controller device 304(1) may allow access, for the user and by the server computer 302(*i*) or the computing device 306(1). The access for the user may be allowed to the controller device 304(1), based on the user security credentials being validated as authentic user credentials. The controller device 304(1) may validate (e.g., authenticate) the user security credentials (e.g., username and/or password) by comparing the user security credentials with the server security credentials. The controller device 304(1) may determine a value (e.g., a checksum) based on the security credentials comparison. The controller device 304(1) may validate the user credentials as authentic user credentials, based on the checksum and/or on the comparison indicating that the user security credentials match the device security credentials (e.g., the username and password received from the user being determined to match a username and password stored in the controller device 304(1)).

In some examples, the server computer 302(*i*) or the computing device 306(1) may utilize the established communication channel to execute software (e.g., a software wizard), for displaying the software with the distributed device information, and for receiving instructions from, the administrator and/or the user. Although communication channels may be established by the controller device(s) 304(1)-304(N), and with the server computers 302(1)-302(M) and/or the computing device(s) 306(1)-306(P) as discussed in this disclosure, it is not limited as such and any of the communication channels can be established to additionally include one or more of the distributed devices 108.

FIG. 3B illustrates the example environment 300 including the server computer(s) 302(1)-302(M) configured to communicate with the controller device(s) 304(1)-304(N) and one or more distributed devices 322(1)-322(Q). Any of the features (e.g., the backup 308, the restore 310, the upgrade 312, the audit 314, the remote access 316, etc.) illustrated in FIG. 3B may be performed similarly as discussed above in FIG. 3A.

The controller device(s) 304(1)-304(N) may perform a remote access 318, and establish a communication channel 320 utilized for the remote access 318. The communication channel 320 and the remote access 318 may be established by the controller device(s) 304(1)-304(N) to create a persistent connection. The persistent connection may be created between the server computers 302(1)-302(M) and the distributed device(s) 322(1)-322(Q), and/or between the computing device(s) 306(1)-306(P) and/or the distributed device(s) 322(1)-322(Q). The communication channel 320 and the remote access 318 may be utilized by the controller device(s) 304(1)-304(N) to forward any information (e.g., distributed device information) between the between the server computers 302(1)-302(M) and the distributed device(s) 322(1)-322(Q), and/or between the computing device(s) 306(1)-306(P) and/or the distributed device(s) 322(1)-322(Q). The persistent connection established by the communication channel 320 and the remote access 318 may be utilized to unlock communications to a previously unreachable network device (e.g., one or more of distributed device(s) 322(1)-322(Q)). The persistent connection may be maintained until the controller device(s) 304(1)-304(N) closes the communication channel 320 and/or the remote access 318.

In some examples, the remote access 318 may be the same as the remote access 316, and based on a same remote access request from any of the controller device(s) 304(1)-304(N), the server computers 302(1)-302(M), or the computing device(s) 306(1)-306(P). In other examples, the remote access 318 may be different than the remote access 316, and based on a remote access request being from the controller device(s) 304(1)-304(N), in comparison to the remote access 316 being based on a different remote access request received from the server computers 302(1)-302(M) or the computing device(s) 306(1)-306(P).

The remote access 318 and/or the communication channel 320 may be established by the controller device(s) 304(1)-304(N) based on the remote access 316. The communication channel 320 may be established similarly as for the communication channel as discussed above in FIG. 3A. In some examples, the communication channel 320 may be established by the controller device(s) 304(1)-304(N), and with one or more of the server computers 302(1)-302(M), the computing device(s) 306(1)-306(P), and/or the distributed device(s) 322(1)-322(Q). In those examples, the communication channel 320 may be established by utilizing the remote access 318 to provide secure communications with the controller device(s) 304(1)-304(N). The remote access 318 may transmit information to, and receive information from, the controller device(s) 304(1)-304(N), and via the communication channel 320.

Although the remote access 318 is established between the controller device(s) 304(1)-304(N) and the server computers 302(1)-302(M) as discussed in this disclosure, it is not limited as such and includes the remote access 318 being established by the controller device(s) 304(1)-304(N), and with the server computers 302(1)-302(M) and/or the computing device(s) 306(1)-306(P), via the communication channel 320. The remote access 318 may be established by the controller device(s) 304(1)-304(N), and with the server computers 302(1)-302(M) and/or the computing device(s) 306(1)-306(P), via the communication channel 320, in any order and in any combination. The remote access 318 may be established, via the communication channel 320, based on any of the controller device(s) 304(1)-304(N) acting as a proxy manager. Any of the controller device(s) 304(1)-304(N) may act as the proxy manager using a protocol of any type (e.g., a secure shell (SSH) protocol, a real-time transport (RTP) protocol, etc.). The protocol may bind the server computers 302(1)-302(M) and/or the computing device(s) 306(1)-306(P), based on input from the user, to any of the distributed computing device(s) 108.

By utilizing the communication channel 320, a user may control the server computers 302(1)-302(M) and/or the computing device(s) 306(1)-306(P) to connect with any of the distributed device(s) 322(1)-322(Q) to directly download the distributed device information to any distributed computing device (e.g., any of the distributed computing devices 108, as discussed above in FIG. 1). By directly downloading the distributed device information to a distributed computing device 108, the server computers 302(1)-302(M) and/or the computing device(s) 306(1)-306(P) can cause the distributed computing device(s) 108 to be utilized by associated devices (e.g., a camera 112, a robotic product packager 114, a user 116, as discussed above in FIG. 1) based on the distributed device information. The distributed device information may include any code (e.g., code for an application, firmware, a configuration, etc.) associated with the distributed computing device(s) 108.

By establishing the communication channel 320, the controller device(s) 304(1)-304(N) may act as a gateway (e.g., a network bridge) for the server computers 302(1)-302(M) and/or the computing device(s) 306(1)-306(P) to communicate, via the communication channel 320, with the distributed device(s) 322(1)-322(Q). The controller device(s) 304(1)-304(N), to establish the gateway, may unlock credentials based on a request from a user via for the server computers 302(1)-302(M) and/or the computing device(s) 306(1)-306(P). The credentials may be unlocked by the controller device(s) 304(1)-304(N) receiving credentials (e.g., user security credentials) input by the user to the controller device(s) 304(1)-304(N), the server computers 302(1)-302(M), and/or the computing device(s) 306(1)-306(P). The controller device(s) 304(1)-304(N) may compare the user security credentials to security credentials (e.g., device security credentials) stored in the controller device(s) 304(1)-304(N). The device security credentials determined as current credentials among a plurality of different device security credentials periodically modified or replaced.

The controller device(s) 304(1)-304(N) may determine (e.g., detect) when the remote access 318 is established between the controller device(s) 304(1)-304(N), and the server computers 302(1)-302(M) and/or the computing device(s) 306(1)-306(P), via the communication channel 320. The controller device(s) 304(1)-304(N) may determine characteristics (e.g., remote access characteristics) associated with the remote access 318 established via the communication channel 320. For example, the controller device(s) 304(1)-304(N) may determine whether the remote access 318 is established for the server computers 302(1)-302(M), for the computing device(s) 306(1)-306(P), and/or for both the server computers 302(1)-302(M), and the computing device(s) 306(1)-306(P). The controller device(s) 304(1)-304(N) may determine, locally with respect to the distributed device(s) 322(1)-322(Q), the remote access characteristics. The remote access characteristics are determined locally, based on the controller device(s) 304(1)-304(N) being within a proximity of the distributed device(s) 322(1)-322(Q). For example, the controller device(s) 304(1)-304(N) may be spaced apart from one or more of the distributed device(s) 322(1)-322(Q) by a distance that is less than, or equal to, a threshold distance.

The controller device(s) 304(1)-304(N) may close the communication channel 320 and/or the remote access 318, based on a request from a user input via the controller device(s) 304(1)-304(N), the server computers 302(1)-302(M) and/or the computing device(s) 306(1)-306(P). In some examples, the controller device(s) 304(1)-304(N) may require that the request is input to the controller device(s) 304(1)-304(N), and refrain from closing the communication channel 320 and/or the remote access 318, based on the request from the user input via the server computers 302(1)-302(M) and/or the computing device(s) 306(1)-306(P). In some examples, the controller device(s) 304(1)-304(N) may close the communication channel 320 and/or the remote access 318, based on an amount of time from the communication channel 320 and/or the remote access 318 being established. For example, the communication channel 320 and/or the remote access 318 may be closed, based on the amount of time meeting or exceeding a threshold amount of time. The threshold amount of time may input to the controller device(s) 304(1)-304(N) by the user, stored in the controller device(s) 304(1)-304(N), and subsequently utilized to close the communication channel 320 and/or the remote access 318.

In some examples, the controller device(s) 304(1)-304(N) may close the communication channel 320 and/or the remote access 318, based on an unauthorized activity, including an unauthorized request, an unauthorized modification (also referred to herein as "disapproved modification"), etc. The unauthorized request may be received via the network and detected by the controller device(s) 304(1)-304(N), the unauthorized request being transmitted by any device/computer (e.g., a device that is internal or external to the workspace and/or the environment). The unauthorized request may be a request that is input to the controller device(s) 304(1)-304(N), the server computers 302(1)-302(M), and/or the computing device(s) 306(1)-306(P). The unauthorized activity (e.g., request, modification, etc.) may be detected and processed similarly, as discussed below.

The controller device(s) 304(1)-304(N) closing the communication channel 320 and/or the remote access 318 may stop the persistent connection from being maintained (e.g., close the persistent connection). Closing the persistent connection may cause the network device to be unreachable, aside from by the controller device(s) 304(1)-304(N). The controller device(s) 304(1)-304(N) may prevent (e.g., refrain from allowing) communications with the distributed device(s) 322(1)-322(Q), by closing the persistent connection. For example, the persistent connection being closed may prevent the distributed device(s) 322(1)-322(Q) from being accessed and/or controlled by the computing device(s) 306(1)-306(P) and/or the distributed device(s) 322(1)-322(Q).

The controller device(s) 304(1)-304(N) may monitor, locally, the distributed device(s) 322(1)-322(Q) and determine whether any unauthorized requests are received for access to the distributed device(s) 322(1)-322(Q). The monitoring of unauthorized requests may be performed periodically based on the scheduling information (e.g., unauthorized requests scheduling information, within the scheduling information). The controller device(s) 304(1)-304(N) may determine whether a request is unauthorized by comparing the user security credentials to the device security credentials and determining that they do not match. The controller device(s) 304(1)-304(N) may store unauthorized request information in a log (e.g., a log including an unauthorized request log), the unauthorized request information including information associated with the unauthorized requests. The unauthorized request information may include an identifier (e.g., IP address) associated with the unauthorized request.

The controller device(s) 304(1)-304(N) may monitor, locally, the distributed device(s) 322(1)-322(Q) and determine operations associated with modifications to the distributed device(s) 322(1)-322(Q). The monitoring of modifications to the distributed device(s) 322(1)-322(Q) may be performed periodically based on the scheduling information (e.g., distributed device scheduling information, within the scheduling information). For example, the controller device(s) 304(1)-304(N) may monitor operations after an outage. The modified operations may include any of the distributed device information (e.g., the application, the firmware, and/or the configuration) being modified. The modified operations may be detected by comparing any of the distributed device information at a time (e.g., a time after an outage at which a comparison is performed) with hashed distributed device information. The hashed distributed device information may be initially determined (e.g., determined at a time prior to the time of the comparison) and stored in the controller device(s) 304(1)-304(N). The hashed distributed device information may be determined by receiving distributed device information and hashing the distributed device information with a key.

By comparing any of the distributed device information (e.g., current distributed device information) with hashed distributed device information (e.g., previous distributed device information), the controller device(s) 304(1)-304(N) may determine whether the current distributed device information, which may also be hashed, is different from the previous distributed device information. If a hash associated with the current distributed device information is different from a hash associated with the previous distributed device information, the controller device(s) 304(1)-304(N) may determine the current distributed device information as modified distributed device information. The controller device(s) 304(1)-304(N) may store, in the log including the unauthorized request log, the modified distributed device information. For example, the log may include the unauthorized request log and/or a modified device log (e.g., a log with the modified distributed device information). Although the log includes the unauthorized request log and the modified device log as discussed in this disclosure, it is not limited as such and the log may be a single, integrated log with the unauthorized request log and the modified device log.

The modified distributed device information may also be determined based on any changes to a network associated with the controller device(s) 304(1)-304(N), the server computers 302(1)-302(M), and/or the computing device(s) 306(1)-306(P). The controller device(s) 304(1)-304(N) may monitor the network (e.g., network traffic) and determine whether one or more changes are made to the devices (e.g., the distributed device information). The controller device(s) 304(1)-304(N) may identify an IP address associated with the change(s) and store it in the log. The IP address may be associated with any of the server computers 302(1)-302(M), any of the computing device(s) 306(1)-306(P), or any different device (e.g., an external device).

The controller device(s) 304(1)-304(N) may transmit the unauthorized request information to the computing device(s) 306(1)-306(P) and/or the server computers 302(1)-302(M). For example, the controller device(s) 304(1)-304(N) may transmit any information in the log (e.g., information in the unauthorized request log and/or the modified device log) as part of the audit 314. The audit 314 may be performed as a health check to detect network modifications and/or device modifications. The information transmitted by the controller device(s) 304(1)-304(N) for the audit 314, based on a request by the user associated with the computing device(s) 306(1)-306(P) and/or the server computers 302(1)-302(M), may be utilized by the computing device(s) 306(1)-306(P) and/or the server computers 302(1)-302(M). For example, the computing device(s) 306(1)-306(P) and/or the server computers 302(1)-302(M) may output an alert (e.g., display an alert indication, output an alert noise, etc.), associated with the information transmitted via the audit 314. The alert may be utilized to indicate that any of the information in the log is associated with modifications (e.g., modifications to the network and/or the devices). For example, the alert may indicate that a new distributed device was added (e.g., plugged in) to be included as one of the distributed device(s) 322(1)-322(Q), or that firmware for one of the distributed device(s) 322(1)-322(Q) was changed.

The computing device(s) 306(1)-306(P) and/or the server computers 302(1)-302(M) may create a ticket, alternatively or additionally to, the alert. The computing device(s) 306(1)-306(P) and/or the server computers 302(1)-302(M) may be controlled, based on input from the user, to approve the modifications to the network and/or the devices (e.g., provide confirmation of the modifications to the network and/or the devices), and/or to update the current distributed device information to be replaced by the modified distributed device information. The computing device(s) 306(1)-306(P) and/or the server computers 302(1)-302(M) may be controlled, based on input from the user, to disapprove the modifications to the network and/or the devices, and/or to refrain from updating the current distributed device information.

The computing device(s) 306(1)-306(P) and/or the server computers 302(1)-302(M) may be controlled, for the disapproved modifications, to erase the disapproved modifications. Alternatively or additionally, the computing device(s) 306(1)-306(P) and/or the server computers 302(1)-302(M) may be controlled to save the disapproved modifications (e.g., to save the disapproved modifications in the log, which may be transmitted, as an updated log, to the controller device(s) 304(1)-304(N)). The computing device(s) 306(1)-306(P) and/or the server computers 302(1)-302(M) may transmit a signal (e.g., a signal including the comparison indicator) to the controller device(s) 304(1)-304(N), indicating approval or disapproval of the modifications to the network and/or the devices. The controller device(s) 304(1)-304(N) may perform similar or different operations, as for the computing device(s) 306(1)-306(P) and/or the server computers 302(1)-302(M), based on the signal including instructions associated with the result of the comparison. Alternatively, the controller device(s) 304(1)-304(N) may determine to perform similar or different operations, as for the computing device(s) 306(1)-306(P) and/or the server computers 302(1)-302(M), regardless of the signal including instructions associated with the result of the comparison.

Although features associated with the audit 314, including, but not limited to, the alert and the approval/disapproval of the modifications are performed by the computing device(s) 306(1)-306(P) and/or the server computers 302 (1)-302(M) as discussed in this disclosure, it is not limited as such and any of the features performed based on, or in response to, the audit 314 may also be performed by the controller device(s) 304(1)-304(N).

Figure 4:
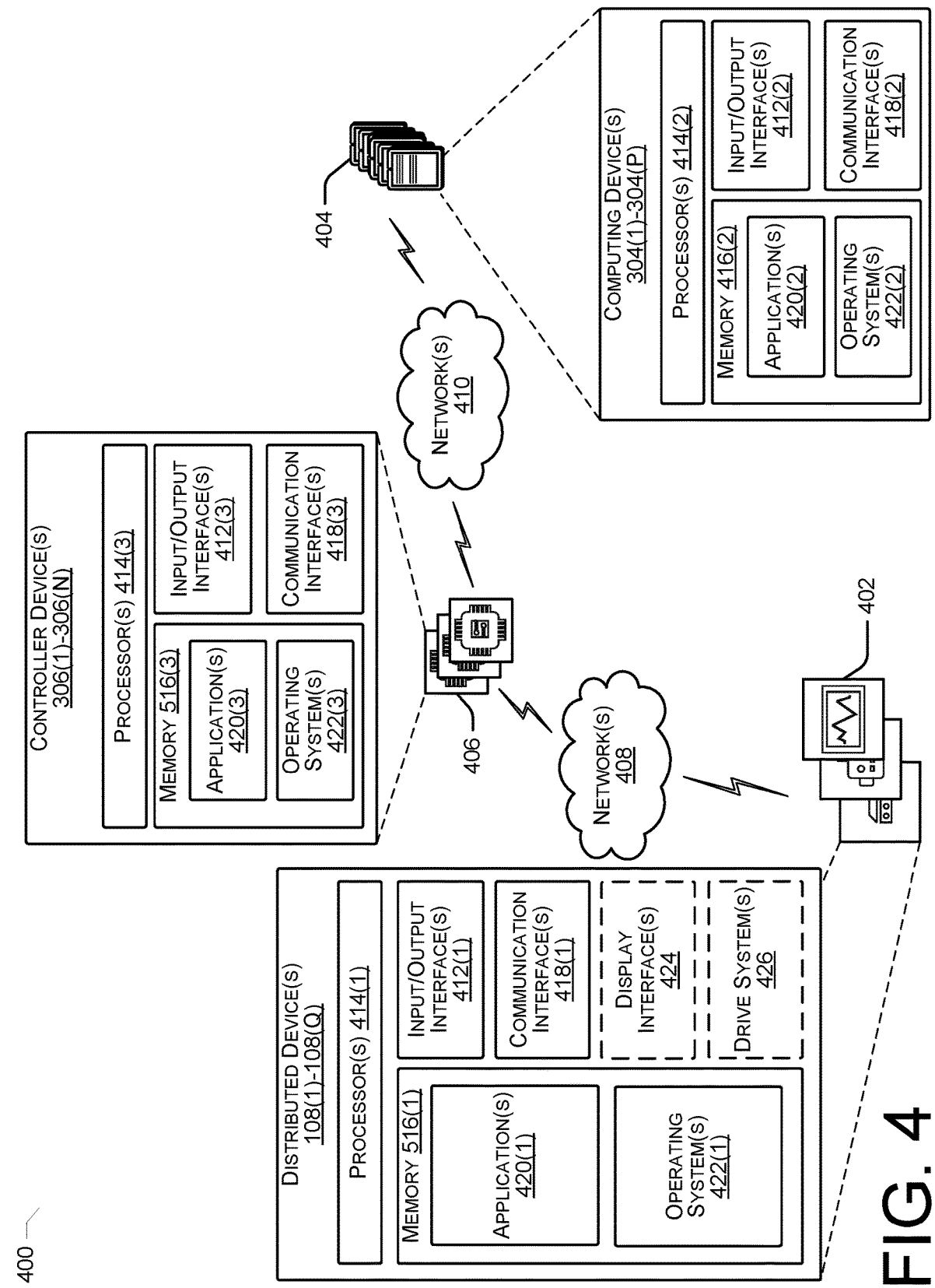
FIG. 4 illustrates an example environment in which one or more distributed devices and one or more computing devices are connected to one or more controller devices, according to an embodiment of the present disclosure.

FIG. 4 illustrates an example environment 400 in which one or more distributed devices 402 and one or more computing devices 404 are connected to one or more controller devices 406, according to an embodiment of the present disclosure.

The distributed device(s) 402 may include one or more distributed devices 108(1)-108(P), the distributed device(s) 108(1)-108(P) including the distributed device(s) 108(1)-108(3) shown in FIG. 1. The computing device(s) 404 may include the computing device(s) 306(1)-306(P) shown in FIG. 3. The controller device(s) 406 may include the controller device(s) 304(1)-304(N) shown in FIG. 3.

The distributed device(s) 402 and the controller device(s) 406 may be configured to communicate with one another via one or more networks 408. The distributed device(s) 402 may communicate with the controller device(s) 406, such as to ensure data backups and data restores, via the controller device(s) 406 and for the distributed device(s) 402. The network(s) 408 may include the Internet, cable networks, cellular networks, wireless networks (e.g., Wi-Fi) and/or wired networks, as well as close-range communications such as Bluetooth®, Bluetooth® low energy, or the like. The distributed device(s) 402 may communicate with the controller device(s) 406, via the network(s) 408 and utilizing different protocols. For example, the distributed device(s) 402 may include the first distributed computing device 108(1), which may be the PLC associated with the camera 112 discussed with respect to FIG. 1. The first distributed computing device 108(1) may utilize a first protocol (e.g., an ethernet/IP protocol) to communicate, with a controller device 406 and via a network 408. For example, the distributed device(s) 402 may include the second distributed computing device 108(1), which may be the robot controller utilized associated with the robotic product packager 114 discussed with respect to FIG. 1. The second distributed computing device 108(1) may utilize a second protocol (e.g., a websites protocol) to communicate, with the controller device 406 and via the network 408. For example, the distributed device(s) 402 may include the third distributed computing device 108(3), which may be the HMI associated with the user 116 discussed with respect to FIG. 1. The third distributed computing device 108(1) may utilize a third protocol (e.g., an FTP protocol) to communicate, with the controller device 406 and via the network 408. For example, the distributed device(s) 402 may include, as a fourth distributed computing device 108(4), the pending distributed computing device 110 discussed with respect to FIG. 1. The pending distributed computing device 110 may be included as the fourth distributed computing device 108(4), based on the pending distributed computing device 110 being added to the distributed device(s) 402 by the controller device 406. The fourth distributed computing device 108(4) may be the barcode scanner controller. The fourth distributed computing device 108(4) may utilize a fourth protocol (e.g., a barcode scanner protocol) to communicate, with the controller device 406 and via the network 408. Although the distributed devices 108(1)-(4) utilizing the first-fourth protocols. being managed by the controller device 406 and via the network 408, are discussed above in this disclosure, it is not limited as such and may include any number of devices of various types utilizing respective protocols, being managed by the controller device 406 and via the network 408.

The computing device(s) 404 and the controller device(s) 406 may communicate with one another via one or more networks 410. The computing device(s) 404 may communicate with the controller device(s) 406, such as to ensure data backups and data restores, via the controller device(s) 406 and for the distributed device(s) 402. The network(s) 410 may include the Internet, cable networks, cellular networks, wireless networks (e.g., Wi-Fi) and/or wired networks, as well as close-range communications such as Bluetooth®, Bluetooth® low energy, or the like) 402 communicating via the network(s) 408 may utilize The computing device(s) 404 may represent, but are not limited to, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device coverable of sending communications and performing the functions according to the techniques described herein.

In the illustrated example, the distributed device(s) 402 and the computing devices 404 configured to communicate with the controller device(s) 406 include one or more processors 414(1), 414(2), and/or 414(3) (collectively processor(s) 414), at least one memory 416(1), 416(2), and/or 416(3) (collectively memory 416), one or more input/output (I/O) interfaces 412(1), 412(2), and/or 412(3) (collectively I/O interface(s) 412), one or more communication (e.g., network) interfaces 418(1), 418(2), and/or 418(3) (communication network interface(s) 418), one or more display interfaces 424 (display interface(s) 424), and/or one or more derive systems 426 (drive system(s) 426). However, not all of the distributed device(s) 402 include the display interface(s) 424 and/or the drive system(s) 426.

The distributed device(s) 402 may include the display interface(s) 424 based on a type of the distributed device(s)

402. The distributed device(s) 402 may include the display interface(s) 424, based on distributed device(s) 402 being the type to utilize the display interface(s) 424. For example, the third distributed computing device 108(3) may include a display interface 424, based on the third distributed computing device 108(3) being the HMI utilizing the display interface 424 for communicating with an administrator or the user 116. The distributed device(s) 402 may include the drive system(s) 426 based on a type of the distributed device(s) 402. The distributed device(s) 402 may include the drive system(s) 426, based on distributed device(s) 402 being the type to utilize the drive system(s) 426. For example, the first distributed computing device 108(1) may include a drive system 426, based on the first distributed computing device 108(1) being the robot controller utilizing the drive system 426 to control the robotic product packager 114. Each processor 414 may include multiple processors and/or a processor having multiple cores. Further, the processor(s) 414 may comprise one or more cores of different types. For example, the processor(s) 414 may include application processor units, graphic processing units, and so forth. In various examples, the processor(s) 414 may include one or more microprocessors, microcomputers, microcontrollers, digital signal processors, central processing units, state machines, logic circuitries, and/or any devices that manipulate signals based on operational instructions. In some examples, the processor(s) 414 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 414 may possess its own local memory, which also may store program components, program data, and/or one or more operating systems.

In some examples, the processor(s) 414 may be configured to fetch and execute computer-readable processor-executable instructions stored in the memory 416. Depending on the configuration of the distributed device(s) 402, the computing devices 404, and the controller device(s) 406, the memory 416 may be an example of tangible non-transitory computer storage media and may include volatile and non-volatile memory and/or removable and non-removable media implemented in any type of technology for storage of information such as computer-readable processor-executable instructions, data structures, program modules or other data. Such memory 416 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 416 may be implemented as computer-readable storage media ("CRSM"), which may be any available physical media accessible by the processor(s) 414 to execute instructions stored on the memory 416. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which can be used to store the desired information, and which can be accessed by the processor(s) 414.

The memory 416 may be used to store and maintain any number of functional components that are executable by the processor 414. In some examples, these functional components comprise instructions or programs that are executable by the processor 414 and that, when executed, implement operational logic for performing the actions and services attributed above to the distributed device(s) 402, the computing devices 404, and the controller device(s) 406. Functional components of the distributed device(s) 402, the computing devices 404, and the controller device(s) 406 stored in the memory 416(1), 416(2), and/or 416(3) may include applications 420(1), 420(2), and/or 420(3) (collectively applications 420). The applications 420 may configure the respective devices to perform functions described herein such as with regard to FIGS. 1-7, 9, and 10.

The functional components of the distributed device(s) 402, the computing devices 404, and the controller device(s) 406 stored in the memory 416(1), 416(2), and/or 416(3) may additionally include operating systems 422(1), 422(2), and/or 422(3), respectively (collectively operating systems 422). The operating system(s) 422 for controlling and managing various functions of the distributed device(s) 402, the computing devices 404, and the controller device(s) 406. The memory 416 may also store other modules and data, which may include programs, drivers, etc., and the data used or generated by the functional components, to enable efficient and effective food order processing. Further, the distributed device(s) 402, the computing devices 404, and the controller device(s) 406 may include many other logical, programmatic and physical components, of which those described are merely examples that are related to the discussion herein. In addition, the memory 416 may also store data, data structures and the like, that are used by the functional components.

The I/O interface(s) 412, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 418 may include one or more interfaces and hardware components for enabling communication with various other devices over the network or directly.

Figure 5:
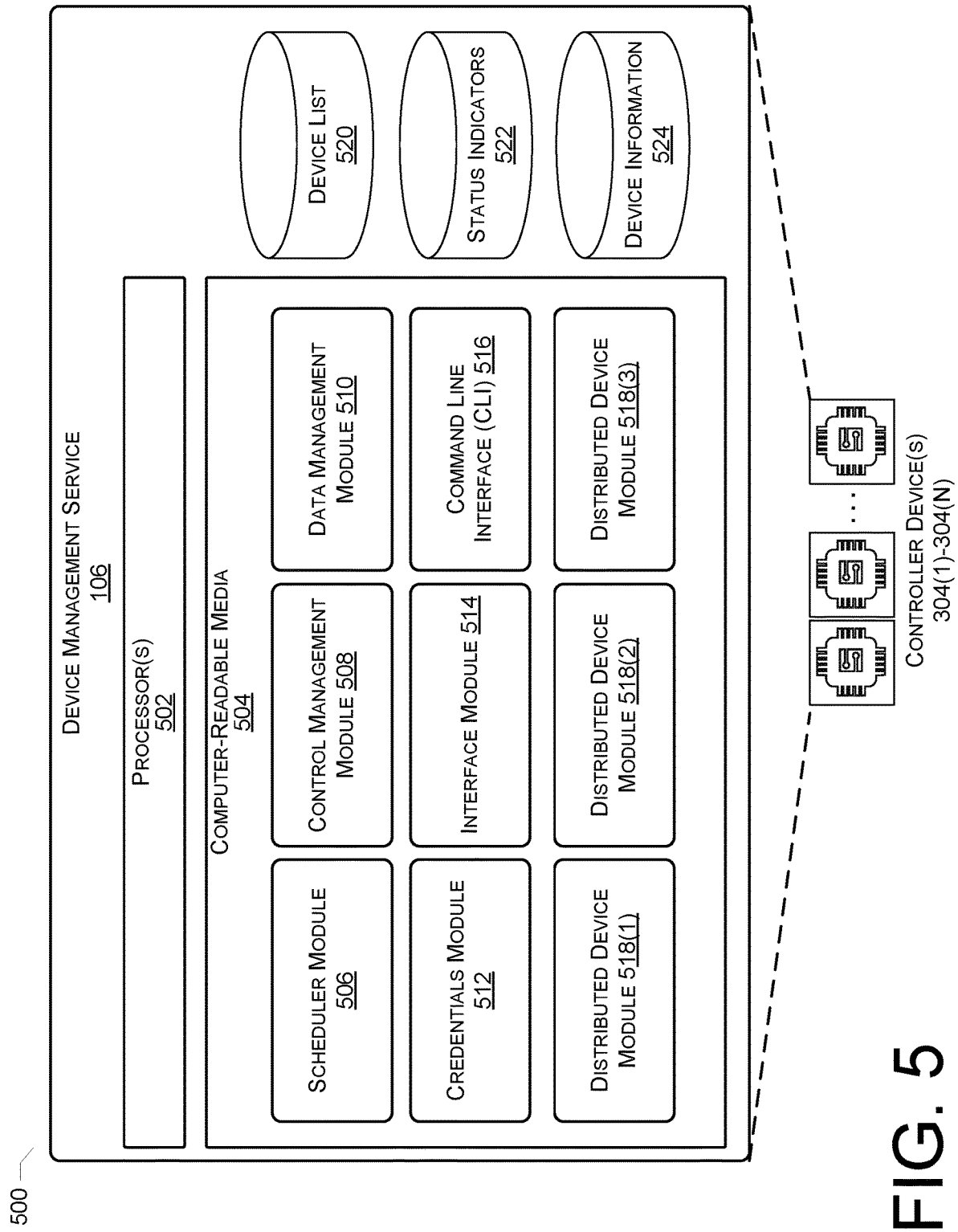
FIG. 5 is a block diagram of an illustrative computing architecture of one or more controller devices shown in FIG. 1.

FIG. 5 is a block diagram of an illustrative computing architecture 500 of one or more controller devices 304(1)-(N) shown in FIG. 3.

The computing architecture 500 may include one or more processors 502 and one or more computer readable media 504 that stores various modules, applications, programs, or other data. The computer-readable media 504 may include instructions that, when executed by the one or more processors 502, cause the processors to perform the operations described herein for the service 106.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 504 may store the service 106. The service 106 may include a scheduler module 506, a control management module 508, a data management module 510, a credentials module 512, an interface module 514, a command line interface (CLI) module 516, and/or one or more distributed device modules 518(1)-518(3), which are described in turn. The modules may be stored together or in a distributed arrangement. The computing architecture may include or have access to a device list 520, one or more status indicators 522, and device information 524.

The scheduler module 506 may enable determining, by the controller devices 304(1)-304(N), a threshold amount of time utilized for routing, as backup data, the distributed device information to the portal device 202. The controller devices 304(1)-304(N) may transmit the distributed device information to the portal device 202, based on scheduling information, including an amount of time since any distributed device (e.g., any of the distributed device(s) 108, as discussed above in the embodiment illustrated in FIGS. 1 and 2) was previously updated. The distributed device information may be transmitted based on the amount of time meeting or exceeding the threshold amount of time (e.g., an expiration of a time period since a previous expiration associated with the distributed device information being transmitted, and/or with the distributed device(s) 108 being previously updated). Transmitting the distributed device information may include transmitting, the device list 520, the status indicator(s) 522, and the device information 524, based on the threshold amount of time. The device list 520, the status indicator(s) 522, and the device information 524 may be received by the portal device 202 shown in FIG. 2, as the device list 214, the status indicator(s) 220, and the device information 222.

The control management module 508 may enable utilizing cloud communication (e.g., communication utilizing protocols including an HTTP protocol, an MQTT protocol, etc.) between the controller devices 304(1)-304(N) and the portal device 202. The controller devices 304(1)-304(N) may utilize the control management module 508 to run a script, determine instructions based on the script, and then transmit the instructions to the scheduler module 506. The scheduler module 506 may determine a checklist of items to process based on the threshold amount of time. The checklist of items may include transmitting the distributed device information based on the amount of time meeting or exceeding the threshold amount of time.

The data management module 510 may enable transmitting (e.g., publishing) the distributed device information to the portal device 202. The controller devices 304(1)-304(N) may transmit the distributed device information to the portal device 202, based on the scheduler module 506 processing the instructions received from the control management module 508 to determine the threshold amount of time.

The credentials module 512 may enable establishing security credentials (e.g., the administrator security credentials and/or the user security credentials) for controlling and/or accessing the controller devices 304(1)-304(N). The security credentials may include credentials including usernames and credentials including passwords. For example, the administrator security credentials may include a username and a password associated with the administrator: and the user security credentials may include a username and a password associated with the user. The credentials module 512 may determine the security credentials and modify (e.g., update) the security credentials based on an amount of time passing since the security credentials were previously updated. The credentials module 512 may modify the security credentials based on the amount of time meeting or exceeding a threshold amount of time.

The interface module 514 may enable communicating between the portal device 202 and the controller devices 304(1)-304(N). The controller devices 304(1)-304(N) may utilize the interface module 514 to receive the backup information, transmit the restore information, receive the upgrade information, transmit the audit information, transmit/receive request(s) associated with remote access 316, transmit/receive remote access request(s) 318, establish the remote access 318, and/or establish the communication channel 320, as discussed above in FIGS. 3A and 3B.

The CLI module 516 may enable communicating with the administrator or the user. By utilizing the CLI module 516, the controller devices 304(1)-304(N) may display the distributed device information, and/or receive instructions from, the administer and/or the user. The distributed device information may be displayed, and/or the instructions may be received, via a user interface of the interface module 514.

The distributed device modules 518(1)-518(3) may enable operation of the distributed computing devices 108(1)-108(3). The controller devices 304(1)-304(N) may run the distributed device modules 518(1)-518(3), and utilize the distributed computing devices 108(1)-108(3) based on the distributed device modules 518(1)-518(3). In some examples, the distributed device modules 518(1)-518(3) may be combined (e.g., integrated with or separate from) the distributed computing devices 108(1)-108(3).

Figure 6:
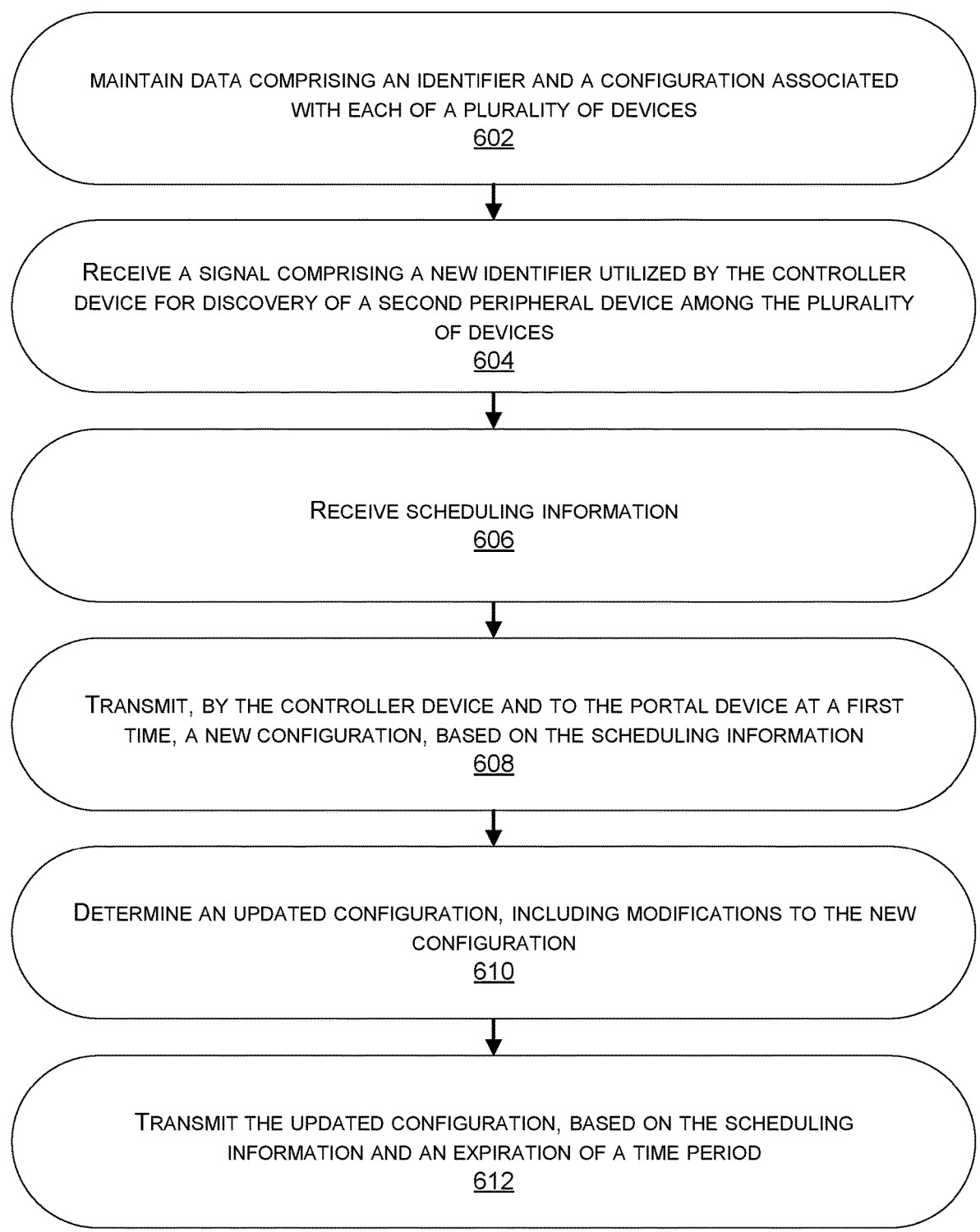
FIG. 6 is a flow diagram of an illustrative process to communicate with one or more computing devices and secure firmware and/or software updates for one or more controller devices.

FIG. 6 is a flow diagram of an illustrative process to communicate with one or more computing devices and secure firmware and/or software updates for one or more controller devices.

At 602, a controller device 102 may maintain data including an identifier and a configuration associated with each of a plurality of devices (e.g., each of the distributed device(s) 108). Each of the plurality of devices 108 may be positioned within a workspace 104 of an environment 100 and configured to perform an operation associated with a function of a first peripheral device (e.g., a distributed device 108(1)). The controller device 102 may be locally positioned in proximity to the plurality of devices 108 and within a predetermined distance from the plurality of devices 108 or the workspace 104. For example, the controller device 102 may be spaced apart from one or more of the plurality of devices 108 by a distance that is less than, or equal to, a threshold distance.

At 604, the controller device 102 may receive a signal including a new identifier utilized by the controller device 102 for discovery of a second peripheral device (e.g., a pending distributed device 110) among the plurality of devices 108. The controller device 102 may associate the new identifier with the device 110, based on the discovery of the device 110, and may determine a new configuration associated with the device 110. The new configuration may be received by the controller device 102 and from the device 110, based on the new configuration having been previously transmitted from a portal device 202 and to the device 110, via a first communication channel 320, the first communication channel 320 being established based on first user security credentials input by a user and to the portal device 202. The first user security credentials may be utilized to provide access for the user to the device 110 based on the first user security credentials being determined to match first device security credentials. The first device security credentials may be determined from a plurality of different device security credentials periodically modified or replaced. The device 110 may be added, by the controller device 102, as one of the devices 108 (e.g., device 108(4)).

At 606, the controller device 102 may receive scheduling information. The portal device 202 may be configured to remotely manage configuration backup capabilities associated with the plurality of devices 108. The scheduling information may include a time period associated with transmission of configuration information associated with the controller device 102 to the portal device 202. The configuration information may be utilized by the portal device 202 to restore configurations of the controller device 102 in an event of an outage associated with the system At 608, the controller device 102 may transmit, to the portal device 202 at a first time, the new configuration, based on the scheduling information.

At 610, the controller device 102 may determine an updated configuration including modifications to the new configuration. The controller device 102 may store, as a replacement for the new configuration, the updated configuration. The updated configuration may be received by the controller device 102 and from the portal device 202, based on the updated configuration having been previously transmitted by the portal device 202 and to the device 110, now device 108(4), via a second communication channel. The second communication channel may be established based on second user security credentials input by the user and to the portal device 202. The second user security credentials may be determined to match second device security credentials. The second device security credentials may be determined based on the first device security credentials being modified or replaced.

At 612, the controller device 102 may transmit the updated configuration, based on the scheduling information and an expiration of the time period. The updated configuration may be transmitted, to the portal device 202, at a second time.

Figure 7:
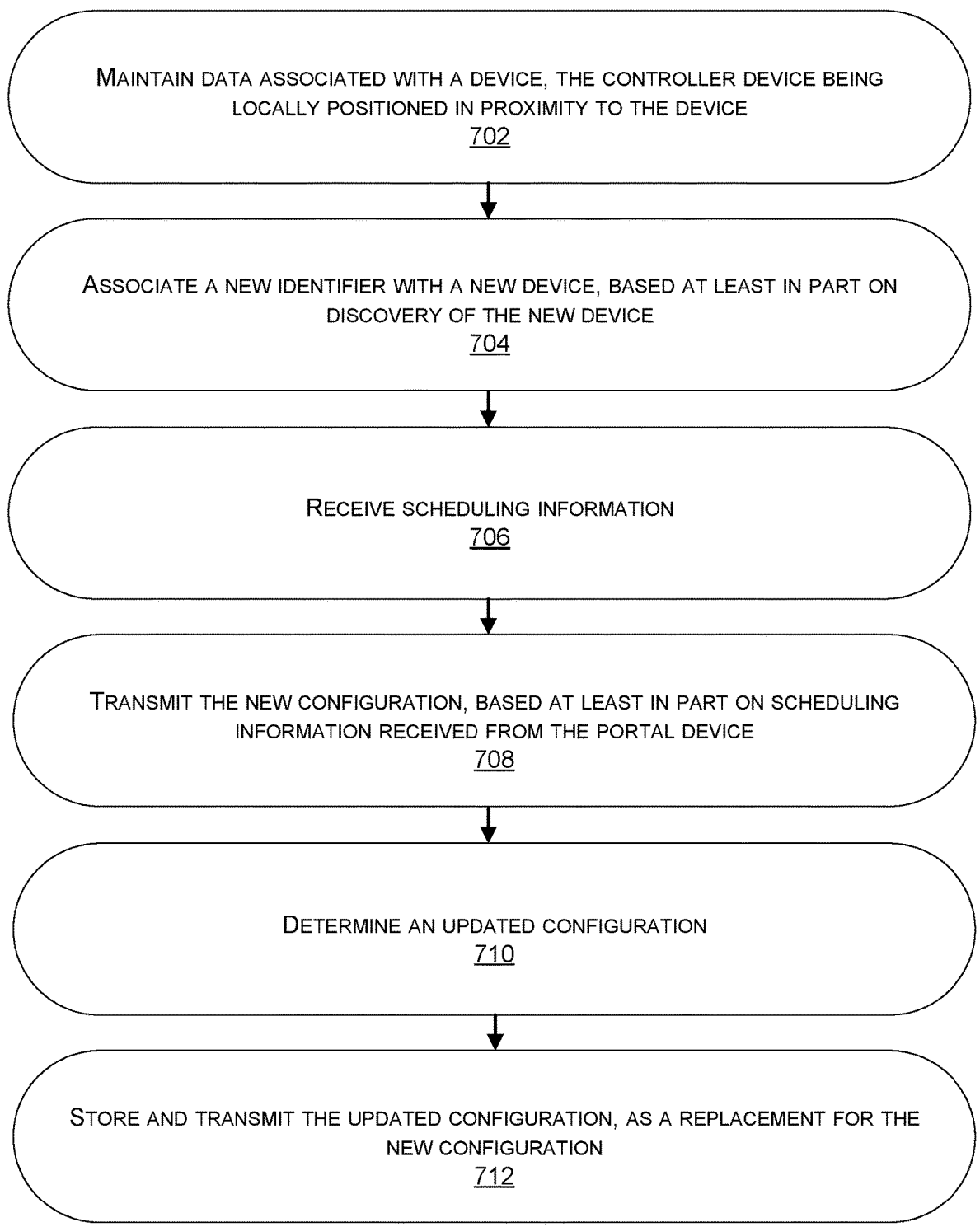
FIG. 7 is a flow diagram of an illustrative process to communicate with one or more computing devices and secure firmware and/or software updates for one or more controller devices.

FIG. 7 is a flow diagram of an illustrative process to communicate with one or more computing devices and secure firmware and/or software updates for one or more controller devices.

At 702, a controller device 102 may maintain data associated with a first peripheral device (e.g., a distributed device 108(1)), the controller device 102 being locally positioned in proximity to the device 108(1). The controller device 102 may be located within a predetermined distance from the device 108(1). The controller device 102 may be in a network with the device 108(1).

At 704, the controller device 102 may associate a new identifier with a new device (e.g., a pending distributed device 110), based at least in part on discovery of the device 110. The controller device 102 may detect the device 110 within the network, based at least in part on the discovery. The device 110 may be added, by the controller device 102, as one of the devices 108 (e.g., device 108(4)).

At 706, the controller device 102 may receive scheduling information. The controller device 102 may determine a new configuration that is received from the portal device 202. The controller device 102 may receive the new configuration from the portal device 202, based on the new configuration having been previously transmitted by the portal device 202 and to the device 110, now device 108(4), via a communication channel. The communication channel may be established based at least in part on one or more user security credentials input to the portal device.

At 708, the controller device 102 may transmit the new configuration, based at least in part on the scheduling information received from the portal device 202. The controller device 102 may transmit the new configuration to the portal device 202. The new configuration may be transmitted with a comparison indicator (e.g., a comparison indicator indicating that the new configuration being transmitted to the portal device 202 based on the scheduling information, is the same as the new configuration that was previously received from the portal device 202).

At 710, the controller device 102 may determine an updated configuration. The updated configuration may include one or more modifications to the new configuration.

At 712, the controller device 102 may store and transmit the updated configuration, as a replacement for the new configuration. The updated configuration may be transmitted via the communication channel.

Figure 8:
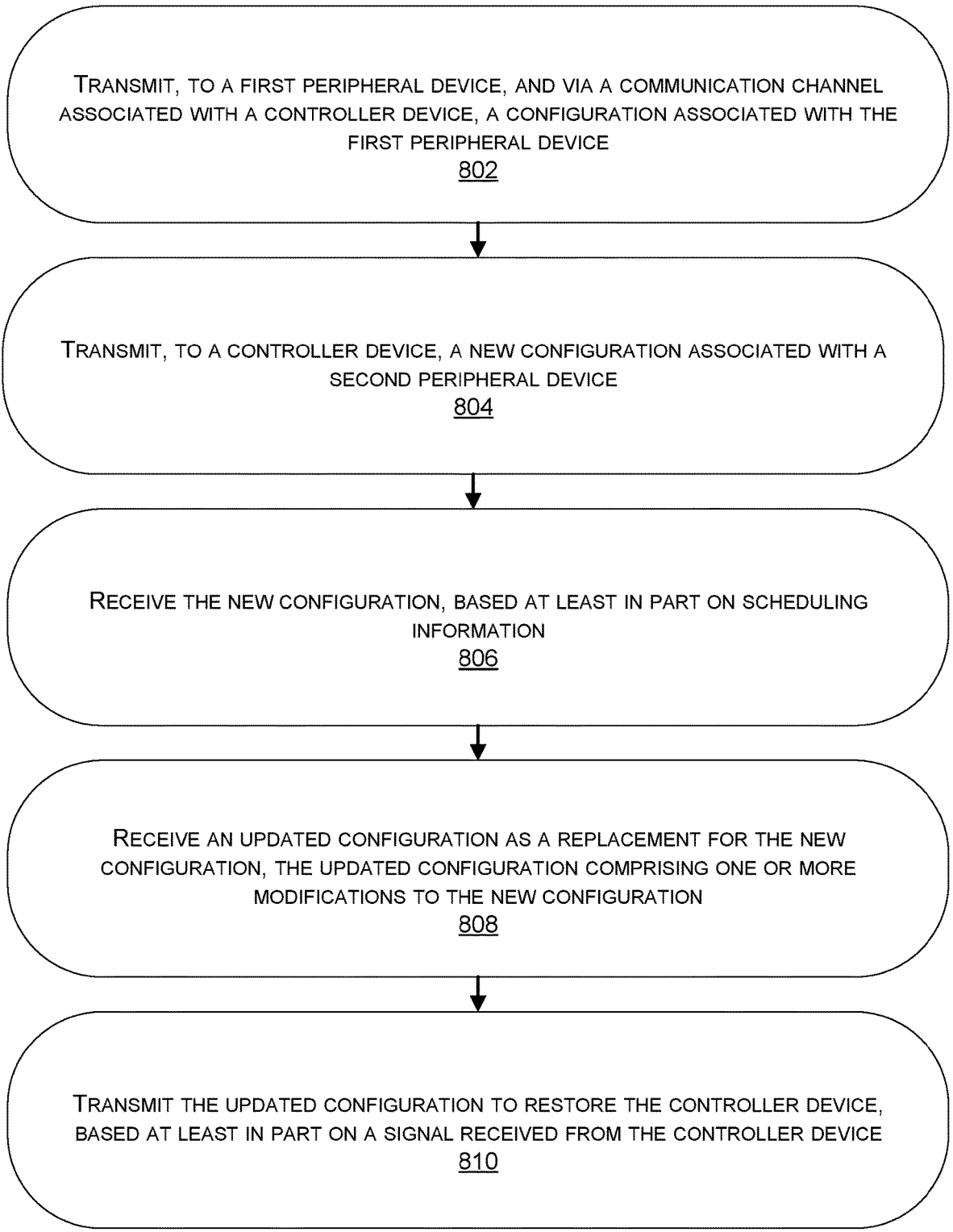
FIG. 8 is a flow diagram of an illustrative process to communicate with one or more computing devices and secure firmware and/or software updates for one or more controller devices.

FIG. 8 is a flow diagram of an illustrative process to communicate with one or more computing devices and secure firmware and/or software updates for one or more controller devices.

At 802, a portal device 202 may transmit, to a first peripheral device (e.g., a distributed device 108(1)), and via a communication channel associated with a controller device 102, a configuration associated with the device 108(1). The communication channel may be established based at least in part on one or more user security credentials received by the portal device 202. The controller device 102 may be located within a predetermined distance from the device 108(1).

At 804, the portal device 202 may transmit, to a controller device 102 a new configuration associated with a second peripheral device (e.g., pending distributed device 110). The device 110 may be added, by the controller device 102, as one of the devices 108 (e.g., device 108(4)).

At 806, the portal device 202 may receive, the new configuration, based at least in part on scheduling information.

At 808, the portal device 202 may receive, an updated configuration as a replacement for the new configuration. The updated configuration may be determined by the controller device 102. The updated configuration may include one or more modifications to the new configuration.

At 810, the portal device 202 may transmit, via the communication channel, the updated configuration to restore the controller device 102, based at least in part on a signal received from the controller device 102. The updated configuration may be transmitted to, and stored by, the controller device 102.

Although the term "user" is utilized throughout this disclosure, it is not limited as such and the term "user" is utilized for simplicity. The term "user" as used throughout disclosure may denote any type of user, including a user, an administrator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:
1. A system comprising:
   at least one processor; and
   at least one non-transitory computer-readable storage medium having computer-executable instructions stored thereon which, when executed on the at least one processor, cause the system to perform operations comprising:

maintaining, by a controller device in a storage device, data comprising an identifier and a configuration associated with each of a plurality of peripheral devices, each of the plurality of peripheral devices being positioned within a workspace of an environment and configured to perform an operation associated with a function of a first peripheral device, the controller device being locally positioned in proximity to the plurality of peripheral devices and within a predetermined geographic distance from the plurality of peripheral devices or the workspace;

receiving, by the controller device and from a second peripheral device not included in the plurality of peripheral devices, a signal comprising a new identifier utilized by the controller device for discovery by the controller device of the second peripheral device among the plurality of peripheral devices;

associating, by the controller device, the new identifier with the second peripheral device, based on the discovery of the second peripheral device;

determining, by the controller device, a new configuration associated with the second peripheral device, the new configuration being received by the controller device and from the second peripheral device, based on the new configuration being previously transmitted from a portal device to the second peripheral device, via a first communication channel, the first communication channel being established based on first user security credentials input by a user and to a user device, the first user security credentials being utilized to enable the user to access the second peripheral device based on the first user security credentials being determined to match first device security credentials, the first device security credentials being determined from a plurality of different device security credentials periodically modified or replaced;

receiving, by the controller device and from the portal device, scheduling information, the portal device being configured to remotely manage configuration backup capabilities associated with the plurality of peripheral devices, the scheduling information comprising a time period associated with transmission of configuration information associated with the controller device to the portal device, the configuration information being utilized by the portal device to restore configurations of the controller device in an event of an outage associated with the system;

transmitting, by the controller device and to the portal device at a first time, the new configuration, based on the scheduling information and a first expiration of the time period;

receiving, by the controller device and from the portal device, an updated configuration and comparison information, based on the new configuration being previously transmitted to the second peripheral device by the portal device, via a second communication channel, the second communication channel being established based on second user security credentials input by the user and to the portal device, the updated configuration comprising modifications to the new configuration as indicated in the comparison information, the second user security credentials being determined to match second device security credentials, the second device security credentials being determined based on the first device security credentials being modified or replaced;

storing, by the controller device in the storage device and as a replacement for the new configuration, the updated configuration; and transmitting, by the controller device and to the portal device at a second time, the updated configuration and a comparison indicator that represents the comparison information, based on the scheduling information and a second expiration of the time period since the first expiration.

2. The system of claim 1, the operations further comprising:
determining, by the controller device, the updated configuration as an erased configuration, based on the updated configuration being erased from the storage device due to a power outage associated with the system;
transmitting, by the controller device and to the portal device, a second signal requesting restoration of the erased configuration;
receiving, by the controller device and from the portal device, the updated configuration; and
storing, by the controller device in the storage device, the updated configuration.

3. The system of claim 1, the operations further comprising:
determining a checksum based on the new configuration and the updated configuration; and
determining the comparison indicator based on the checksum.

4. The system of claim 1, the operations further comprising:
determining a comparison indicator associated with the updated configuration being different from the new configuration, the comparison indicator being transmitted with the new configuration to the portal device; and
receiving, by the controller device and from the portal device, a second signal indicating the new configuration being replaced by the updated configuration, based on the updated configuration being different from the new configuration.

5. The system of claim 1, the operations further comprising:
receiving, by the controller device and from the portal device, second user security credentials input by a second user, the second user security credentials comprising a username and a password;
performing, by the controller device, validation of the second user security credentials; and
allowing, by the controller device, remote access for the second user and to the second peripheral device, based on the second user security credentials being validated as authentic user credentials.

6. The system of claim 1, wherein the plurality of peripheral devices are communicatively connected to the controller device via a local network.

7. The system of claim 1, wherein the plurality of peripheral devices are communicatively connected to the controller device utilizing at least one of a wired computer networking technology or a short-range wireless technology protocol.

8. The system of claim 1, wherein the predetermined geographic distance is less than a geographic distance between the plurality of peripheral devices and the portal device.

9. A system comprising:
at least one processor; and
at least one non-transitory computer-readable storage medium having computer-executable instructions stored thereon which, when executed by the at least one processor, cause the system to perform operations comprising:
- maintaining, by a controller device in a storage device, data comprising a first identifier associated with a first peripheral device within a network, the controller device being located within a predetermined geographic distance from the first peripheral device;
- detecting, by the controller device, a second peripheral device represented by a new identifier within the network, based at least in part on discovery by the controller device of the second peripheral device;
- associating, by the controller device, the new identifier with the second peripheral device based on the discovery of the second peripheral device;
- receiving, by the controller device and from a portal device, scheduling information;
- determining, by the controller device, a new configuration associated with the second peripheral device, the new configuration being received by the controller device and from the second peripheral device, based at least in part on the new configuration being previously transmitted by the portal device and to the second peripheral device, via a communication channel, the communication channel being established based at least in part on one or more user security credentials input to the portal device;
- transmitting, by the controller device and to the portal device, the new configuration to be associated with the new identifier, based at least in part on the scheduling information;
- determining, by the controller device, an updated configuration and comparison information, the updated configuration comprising one or more modifications to the new configuration, the comparison information indicating that the updated configuration is different from the new configuration; and
- storing and transmitting, by the controller device and to the portal device, the updated configuration and a comparison indicator that represents the comparison information, the updated configuration being stored and associated with the new identifier in the portal device as a replacement for the new configuration based at least in part on the comparison indicator.

10. The system of claim 9, wherein maintaining the data further comprises maintaining second data comprising an identifier and a configuration associated with each of a plurality of peripheral devices, each of the plurality of peripheral devices being positioned within an environment and configured to perform different operations associated with different functions of the plurality of peripheral devices, a first function of the first peripheral device of the plurality of peripheral devices being different from a second function of the second peripheral device of the plurality of peripheral devices.

11. The system of claim 9, wherein the updated configuration is received by the controller device and from the portal device, based at least in part on the updated configuration being previously transmitted from the portal device and to the second peripheral device, via a second communication channel, the second communication channel being established based at least in part on one or more second user security credentials input to the portal device.

12. The system of claim 9, wherein:
the one or more user security credentials are utilized to provide access for a user to the portal device based at least in part on first user security credentials being determined to match first device security credentials, the first device security credentials being determined from a plurality of different device security credentials periodically modified or replaced; and
the updated configuration is received by the controller device and from the portal device, based at least in part on the updated configuration being previously transmitted from the portal device and to the second peripheral device, via a second communication channel, the second communication channel being established by the portal device based at least in part on second user security credentials input by the user and to the portal device, the second user security credentials being determined to match second device security credentials, the second device security credentials being determined based at least in part on the first device security credentials being modified or replaced.

13. The system of claim 9, the operations further comprising:
receiving, by the controller device and from the second peripheral device, a first signal comprising the new identifier, the first signal being utilized for the discovery of the second peripheral device;
determining, by the controller device, the updated configuration as an erased configuration, based at least in part on the updated configuration being erased from the storage device due to a power outage associated with the controller device;
transmitting, by the controller device and to the portal device, a second signal requesting restoration of the erased configuration;
receiving, by the controller device and from the portal device, the updated configuration; and
storing, by the controller device in the storage device, the updated configuration.

14. The system of claim 9, the operations further comprising:
determining a checksum based at least in part on the new configuration and the updated configuration; and
determining the comparison indicator based at least in part on the checksum.

15. The system of claim 9, the operations further comprising:
receiving, by the controller device and from the portal device, a signal indicating the new configuration being replaced by the updated configuration, based at least in part on the updated configuration being different from the new configuration.

16. A method comprising:
transmitting, by a portal device, to a first peripheral device, and via a communication channel associated with a controller device, a configuration associated with the first peripheral device, the communication channel being established based at least in part on one or more user security credentials received by the portal device;
transmitting, by the portal device, to the controller device, the configuration, the controller device maintaining data associated with the first peripheral device and being located within a predetermined geographic distance from the first peripheral device;
receiving, by the portal device, from the controller device, a new configuration associated with a second peripheral device after the second peripheral device is detected via a broadcast signal comprising a new identifier based at least in part on discovery by the controller device;

associating, by the controller device, the new identifier with the second peripheral device, based on the discovery of the second peripheral device;

receiving, by the portal device and from the controller device, an updated configuration that comprises one or more modifications to the new configuration and a comparison indicator that represents comparison information;

storing the updated configuration in the portal device as a replacement for the new configuration in response to the comparison information indicating that the updated configuration is different from the new configuration; and transmitting, by the portal device and to the controller device, the updated configuration to restore the controller device, based at least in part on a signal received from the controller device.

17. The method of claim 16, wherein the controller device maintains second data comprising an identifier and a configuration associated with each of a plurality of devices, each of the plurality of devices being positioned within a workspace of an environment and configured to perform different operations associated with different functions of the plurality of devices, the plurality of devices comprising the first peripheral device and the second peripheral device, a first function of the first peripheral device being different from a second function of the second peripheral device.

18. The method of claim 16, wherein the updated configuration is transmitted by the portal device and to the controller device, based at least in part on the updated configuration being previously transmitted from the portal device and to the second peripheral device, via a second communication channel, the second communication channel being established by the controller device based at least in part on different user security credentials input to the portal device, the different user security credentials being transmitted to the controller device, the different user security credentials being determined by the controller device to match device security credentials associated with the controller device.

19. The method of claim 16, further comprising:

obtaining access for a user to the controller device based at least in part on the one or more user security credentials being transmitted to the controller device, and further based at least in part on the one or more user security credentials being determined by, the controller device to match device security credentials associated with the controller device, the device security credentials being periodically modified or replaced by different device security credentials.

20. The method of claim 16, further comprising:

storing, in a storage device of the portal device, the updated configuration based at least in part on a comparison result received from the controller device, the comparison result indicating that the updated configuration is different from the new configuration.

* * * * *